March 17, 1936.    H. G. JOHNSTONE    2,034,260
ACCOUNTING SYSTEM
Filed Nov. 17, 1932    11 Sheets-Sheet 1

INVENTOR
H. G. JOHNSTONE
BY H. R. Whitehorn
ATTORNEY

March 17, 1936.　　H. G. JOHNSTONE　　2,034,260
ACCOUNTING SYSTEM
Filed Nov. 17, 1932　　11 Sheets-Sheet 2

INVENTOR
H. G. JOHNSTONE
BY H. A. Whitehorn
ATTORNEY

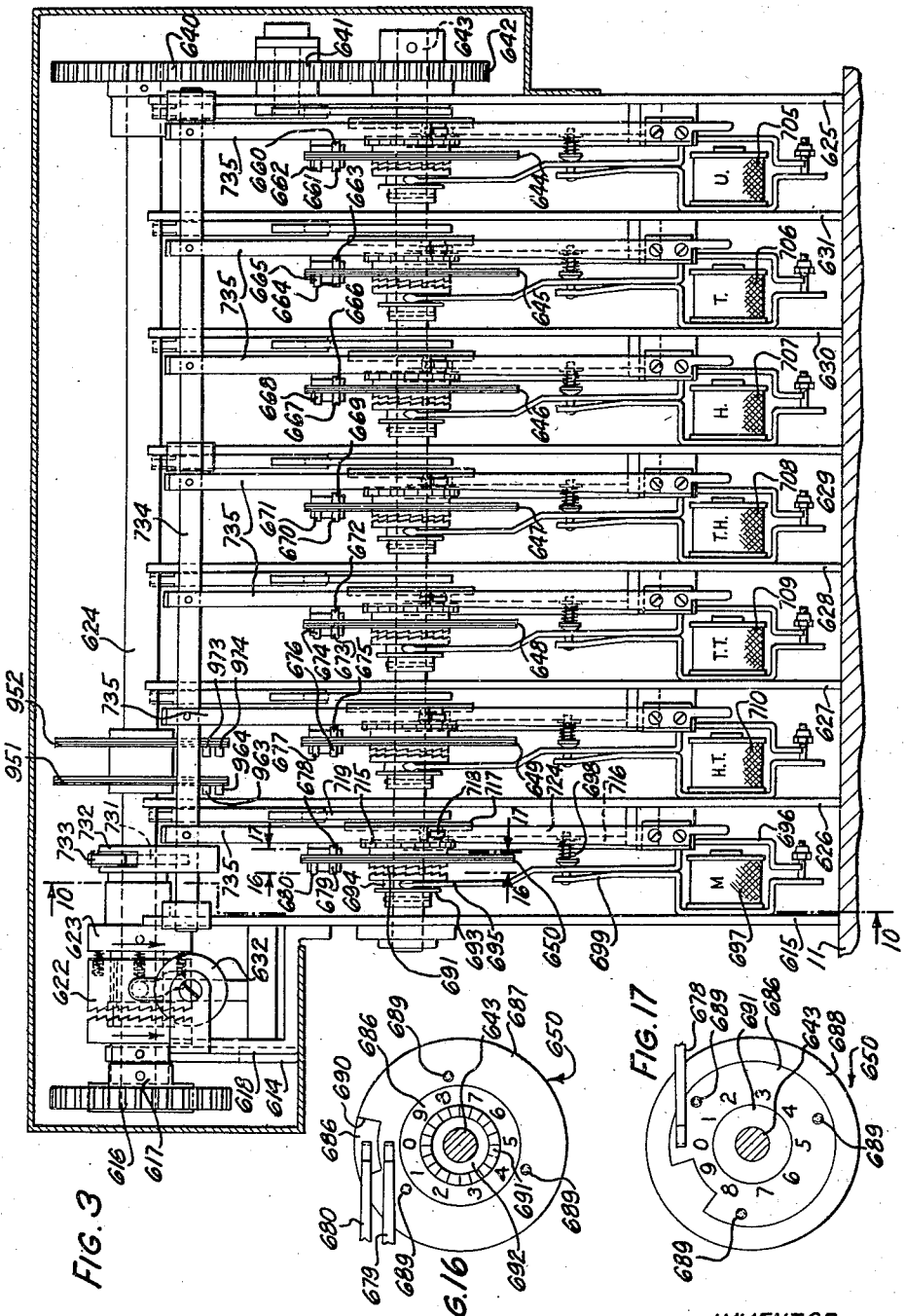

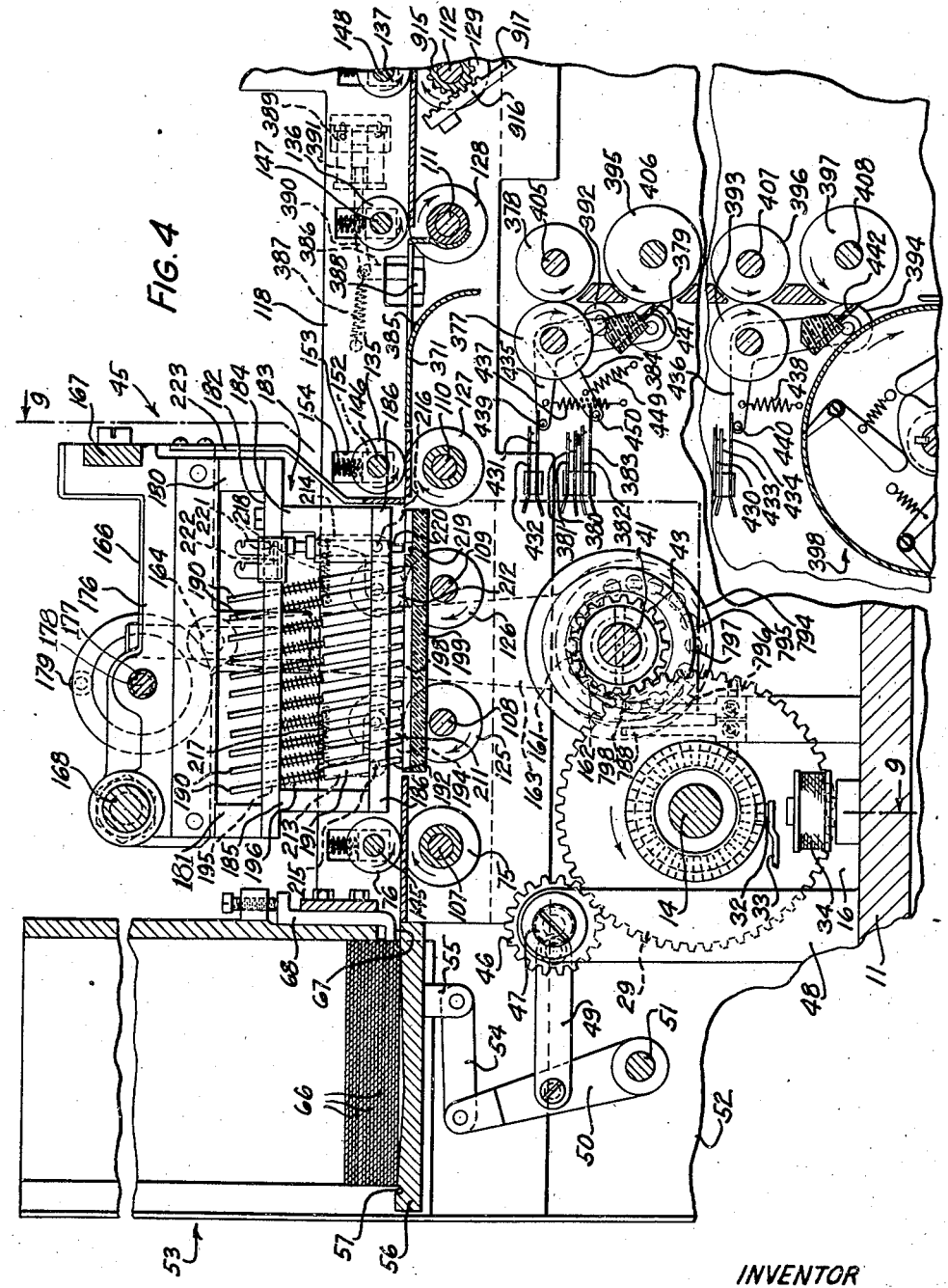

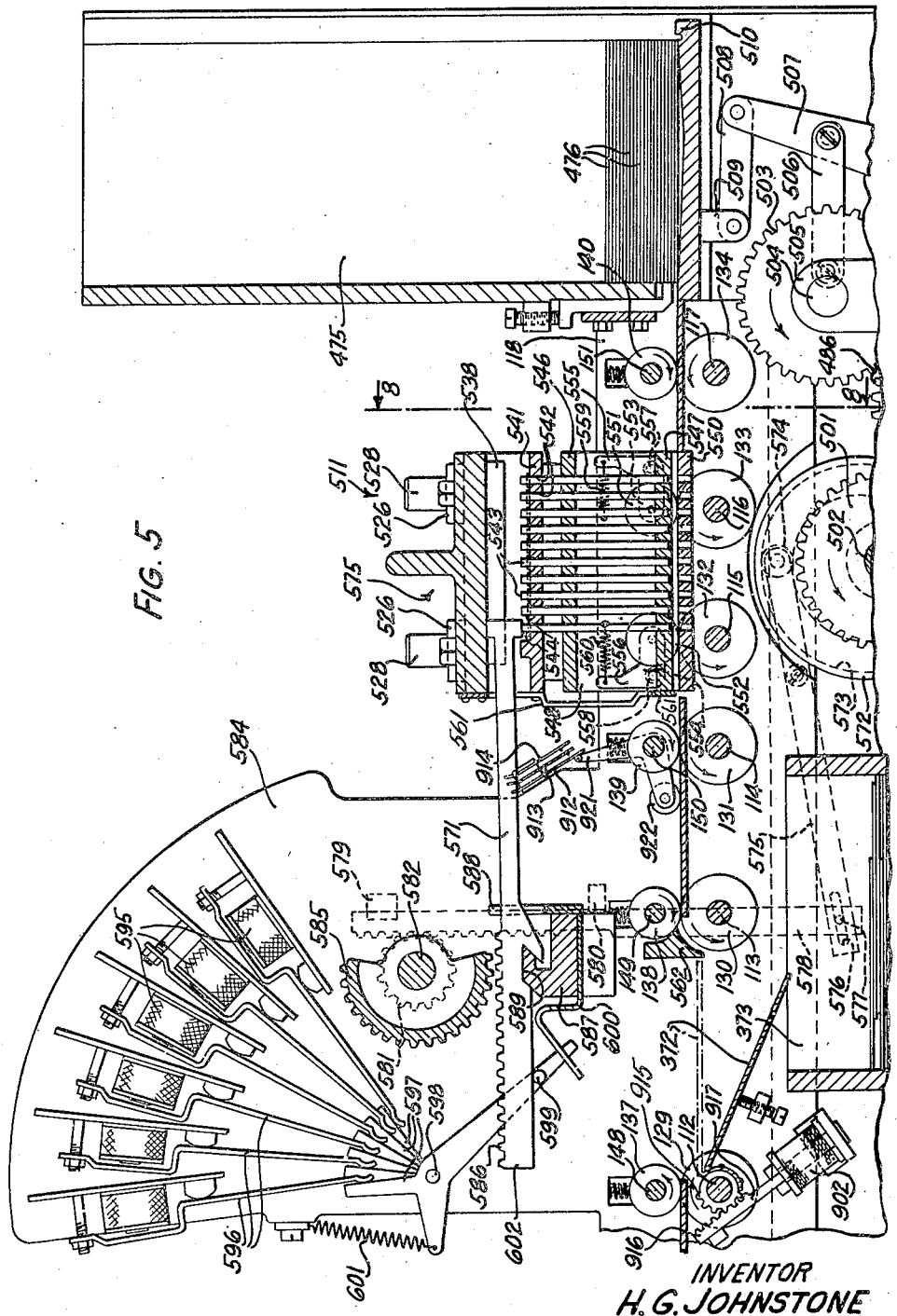

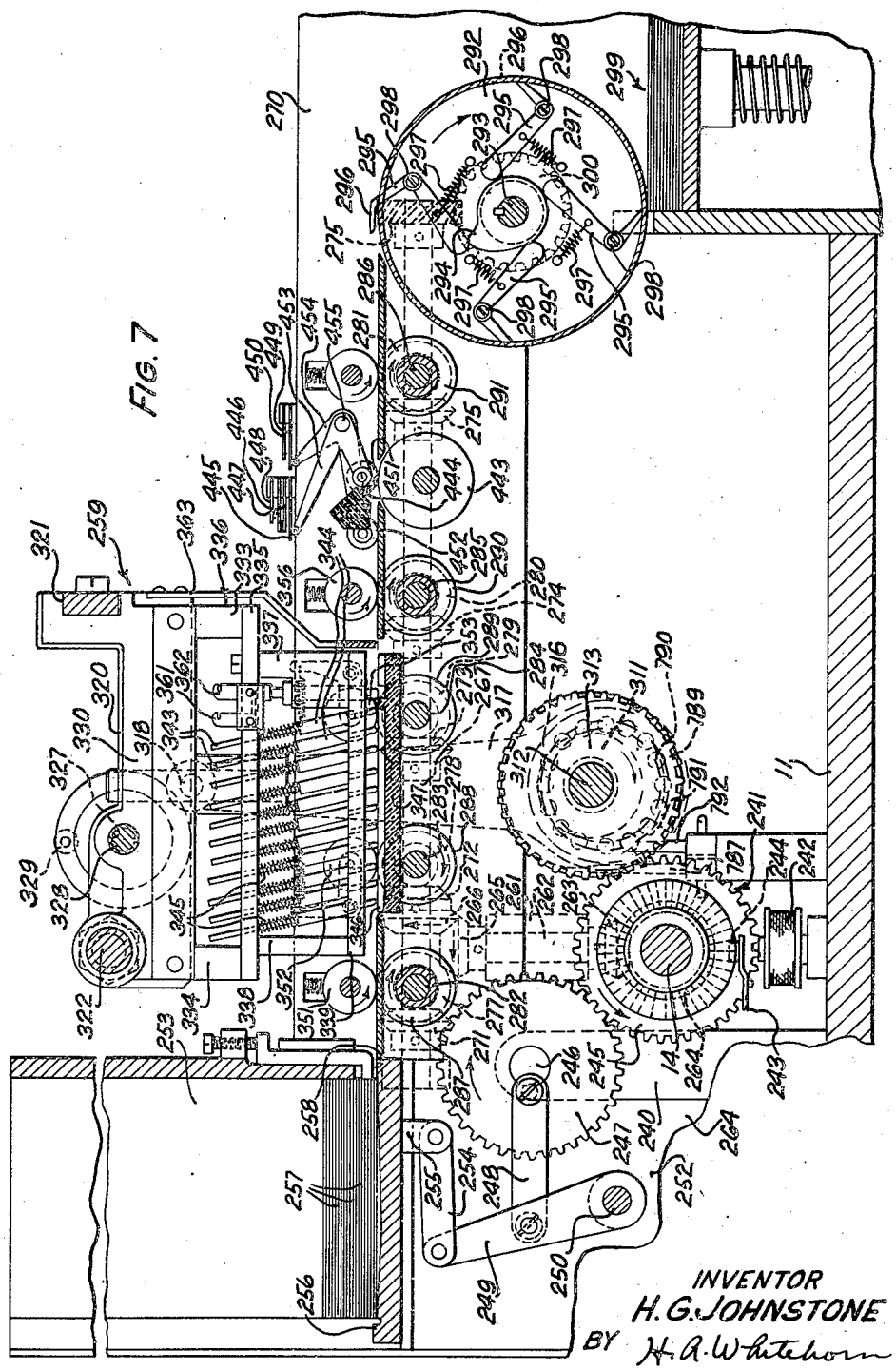

March 17, 1936.  H. G. JOHNSTONE  2,034,260
ACCOUNTING SYSTEM
Filed Nov. 17, 1932  11 Sheets-Sheet 7

INVENTOR
H. G. JOHNSTONE
BY H. A. Whitehorn
ATTORNEY

March 17, 1936.  H. G. JOHNSTONE  2,034,260
ACCOUNTING SYSTEM
Filed Nov. 17, 1932   11 Sheets-Sheet 8
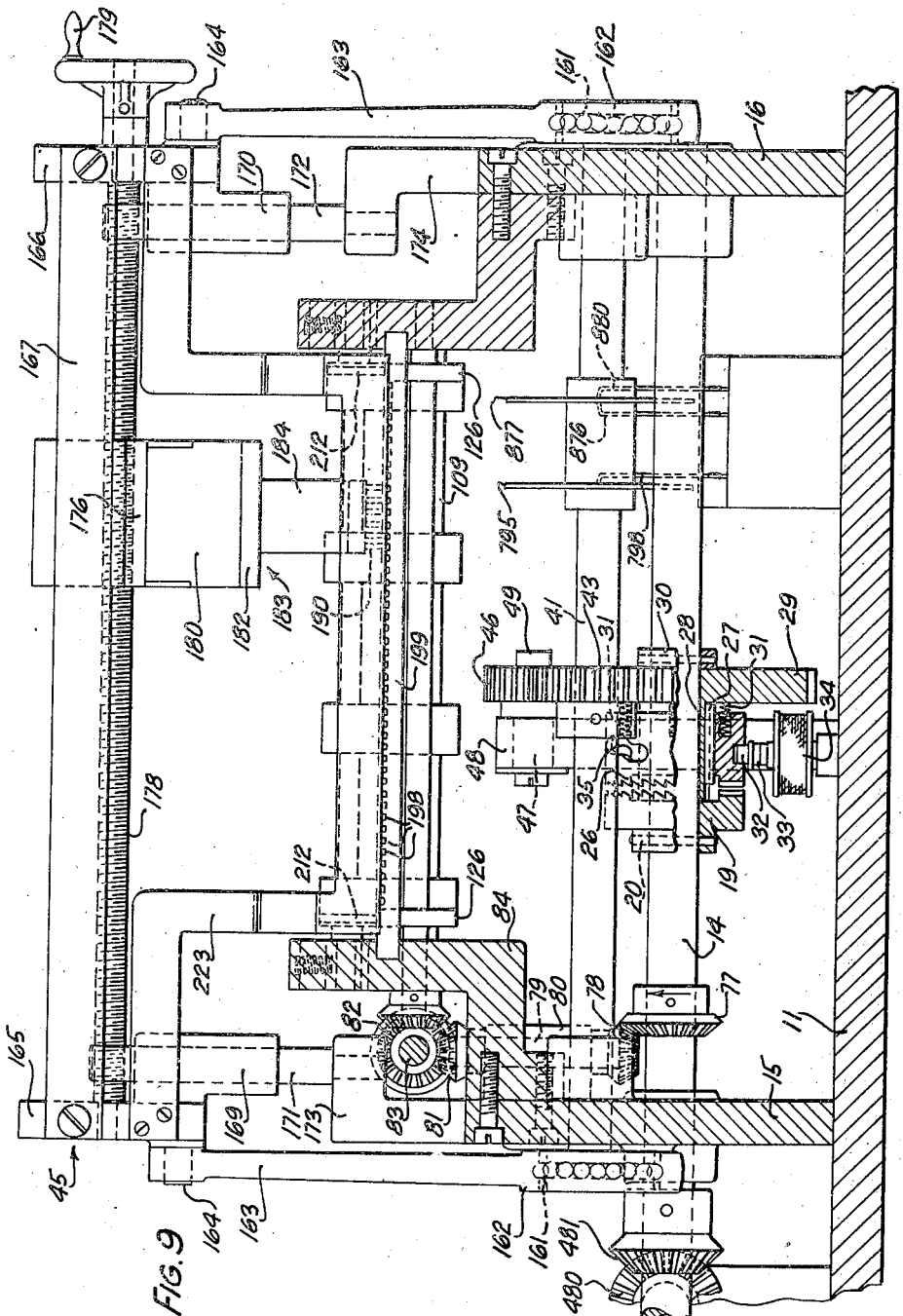

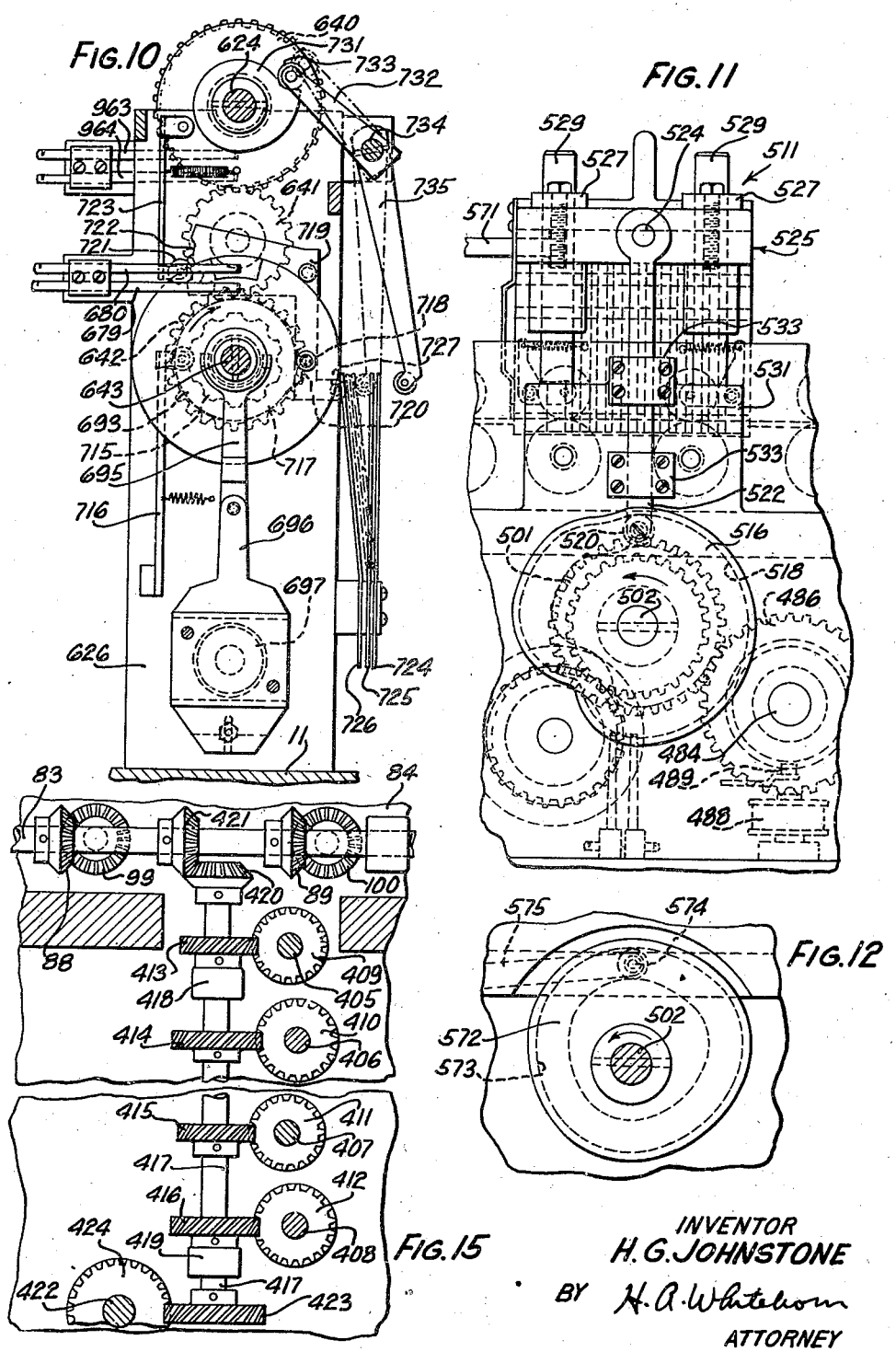

March 17, 1936.  H. G. JOHNSTONE  2,034,260
ACCOUNTING SYSTEM
Filed Nov. 17, 1932  11 Sheets-Sheet 10

INVENTOR
H. G. JOHNSTONE
BY H. A. Whitehorn
ATTORNEY

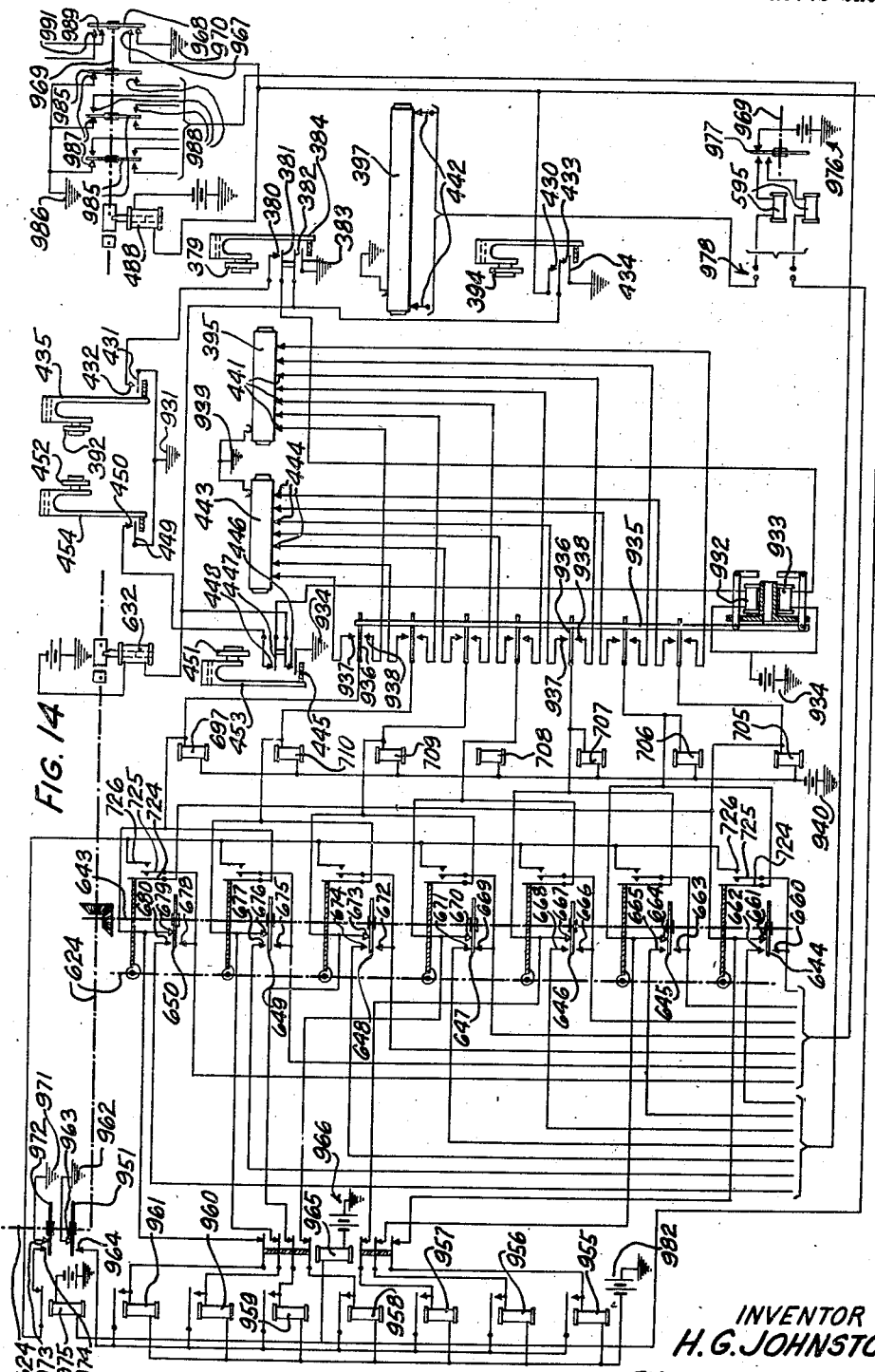

Patented Mar. 17, 1936

2,034,260

UNITED STATES PATENT OFFICE 2,034,260

ACCOUNTING SYSTEM

Harold G. Johnstone, Chicago, Ill., assignor to Western Electric Company, Incorporated, New York, N. Y., a corporation of New York Application November 17, 1932, Serial No. 643,018

4 Claims. (Cl. 235—92)

This invention relates to accounting systems, and more particularly to record comparing mechanisms for accounting systems.

It is an object of the invention to provide an apparatus for automatically and rapidly comparing records.

In accordance with one embodiment the invention contemplates the provision in an accounting system of apparatus for searching through a file of records to find a record representing a classification corresponding to a classification in which a transaction has occurred and controlling the feeding of cards to institute an accounting and card preparing operation automatically upon the finding of said record in the record file thereby to correct the record file by replacing the superseded record.

Other objects and advantages of the invention will be apparent by reference to the following specification when taken in conjunction with the accompanying drawings, wherein Fig. 1 is a fragmentary plan view of that portion of the machine which handles the file cards;

Fig. 3 is an enlarged sectional view taken along the line 3—3 of Fig. 1 in the direction of the arrows showing the structure of the register mechanism;

Fig. 4 is an enlarged fragmentary sectional view taken along the line 4—4 of Fig. 1 in the direction of the arrows showing the structural features of the file sensing station;

Fig. 5 is an enlarged fragmentary sectional view taken substantially along the line 5—5 of Fig. 1 in the direction of the arrows showing the file card perforating mechanism and when placed to the right of Fig. 4 will, in conjunction with Fig. 4, show a complete vertical sectional view through the upper portion of the mechanism for sensing the file cards and perforating new file cards;

Fig. 7 is a vertical sectional view taken substantially along the line 7—7 of Fig. 2 in the direction of the arrows, and shows the details of the structure of the item sensing station;

Fig. 9 is a vertical sectional view taken along the line 9—9 of Fig. 4 in the direction of the arrows;

Fig. 10 is a sectional view taken along the line 10—10 of Fig. 3 in the direction of the arrows showing the details of construction of the register mechanism;

Fig. 11 is a fragmentary vertical sectional view taken along the line 11—11 of Fig. 1 in the direction of the arrows showing in detail the cams for operating the perforating mechanism;

Fig. 12 is a fragmentary sectional view taken along the line 12—12 of Fig. 8 in the direction of the arrows showing the details of construction of a portion of the perforating mechanism;

Figs. 13 and 14 are circuit diagrams which, when viewed collectively with Fig. 13, placed above Fig. 14 disclose the electrical connections for controlling the operation of the various parts of the system in accordance with the preferred embodiment of the invention;

Figure 1:
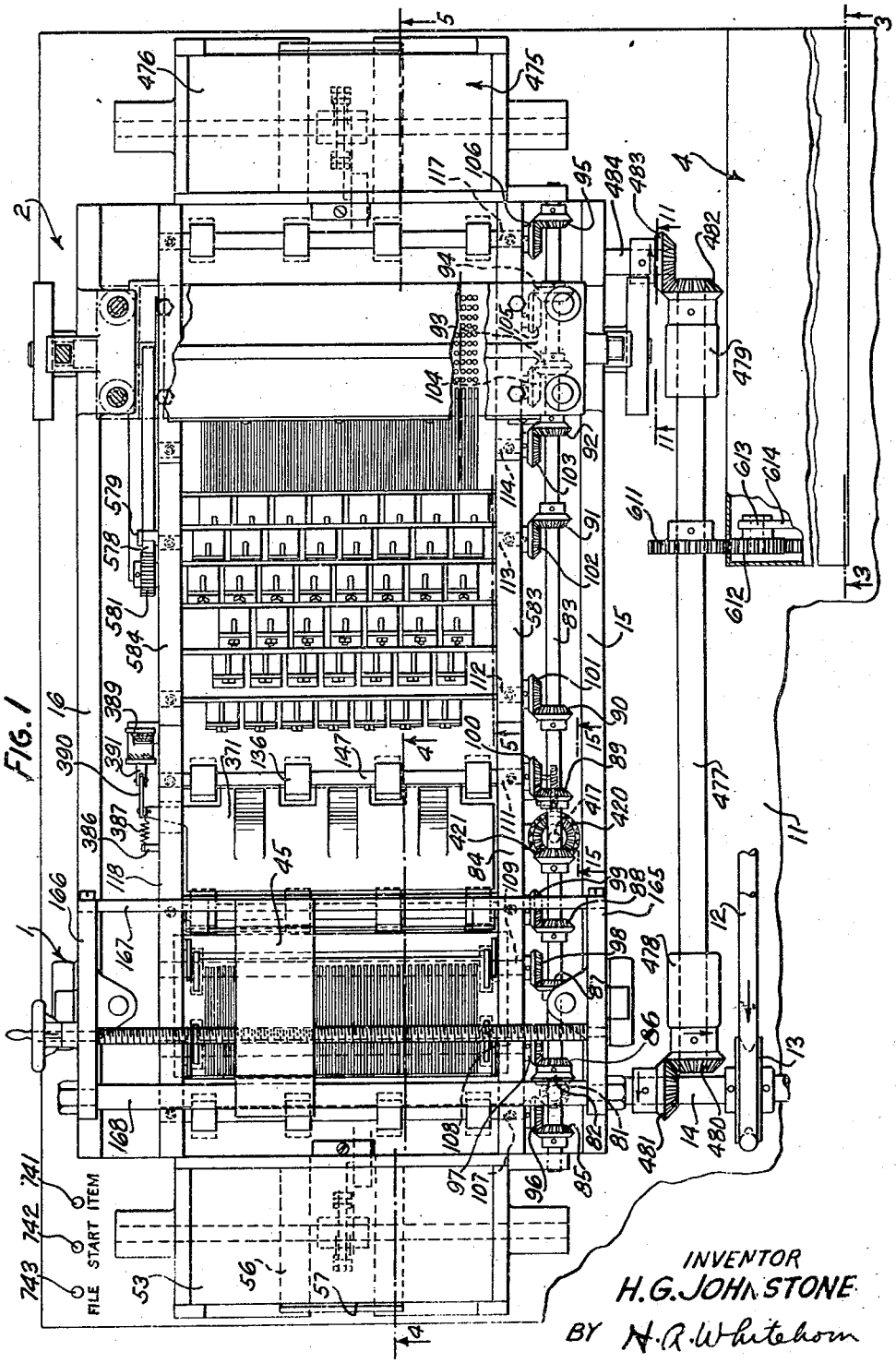

Fig. 15 is a fragmentary sectional view taken on the line 15—15 of Fig. 1 in the direction of the arrows, and Figs. 16 and 17 are fragmentary sectional views taken along lines 16—16 and 17—17 of Fig. 3 in the direction of the arrows.

In general the mechanism for keeping a constant inventory of stock on hand in a large industrial or commercial institution where a file containing statistical cards is kept having a card therein representing each type of apparatus or raw material carried by the concern forms the subject matter of this specific disclosure. As is usual in accounting systems where statistical record cards are used, each type of apparatus is assigned a separate piece number and the card assigned to a certain type of material or article has perforated thereon information representing the number of parts or articles of that particular type on hand. Whenever a withdrawal or addition is made to a supply of a certain type of article or material, a card is prepared having perforated therein information representing the type of material withdrawn or added together with the quantity withdrawn or added. These cards are sent to the accounting organization wherein the file cards are stored and a new file card prepared after which the superseded file card may be destroyed and the card representing the withdrawal from or additions to stock, which will hereafter be called the item card, may be stored for future reference or may be destroyed and the file will represent the condition of the stock at the time the new file cards are prepared.

In order to accomplish automatically this stockkeeping or posting operation, the file cards are sorted into numerical order with reference to the stock or type identifying number, and the item cards representing stock additions or withdrawals are also sorted into numerical order with reference to the stock or type number and the file and item cards are deposited in separate magazines from which they are withdrawn one at a time to sensing stations where they are electrically compared in the following manner: The machine draws an item card into the item sensing station and draws a plurality of the file cards into and through the file sensing station until a file card is found which bears a stock number corresponding to the stock number on the item card whereupon the file card is held in the sensing station and succeeding item cards are withdrawn from their magazine through the item sensing station as long as they bear the same stock number as that inscribed on the file card being held in the file sensing station. As each item card passes out of the sensing station, it adds algebraically upon a register the quantity of the stock movement (addition or withdrawal) as indicated by perforations in an area of the item cards which is different from the area bearing the stock number and then the cards are directed to an item card receptacle.

When an item card is withdrawn from the magazine which does not agree with the file card held in the file sensing station, the file card which has been held in the sensing station passes out of the sensing station and the machine adds algebraically the quantity of stock as represented by perforations therein to the register that the item cards control, and the register will then indicate the quantity of that particular type of stock which is on hand. Without stopping, the file card continues through a second sensing station which sets up in a punching mechanism all information which is inscribed in the card except that representing the quantity of stock, and simultaneously the register mechanism sets up in the punching mechanism the quantity representing the balance of stock on hand, and a new file card is withdrawn from a third magazine and punched in accordance with the information taken from the register and the superseded file card. Those file cards, which have not been superseded due to the fact that no item card was present in the item card magazine carrying a stock number corresponding to the number on the file cards are filed in numerical order, and the new file card is interfiled in the final file magazine in proper numerical order with them. The superseded file card, after transmitting all of the information except the quantity of stock on hand to the perforating mechanism, is directed to a separate final magazine and may be destroyed since the file of file cards will represent accurately the quantity of stock of various classifications in numerical order, and the card receptacle containing the item cards which have passed through the machine will contain all of the posted item cards.

The machine disclosed herein is also disclosed in the copending application of H. G. Johnstone and J. C. Gates, Serial No. 643,016, filed November 17, 1932, wherein certain features, not claimed in this application, are claimed.

Figure 2:
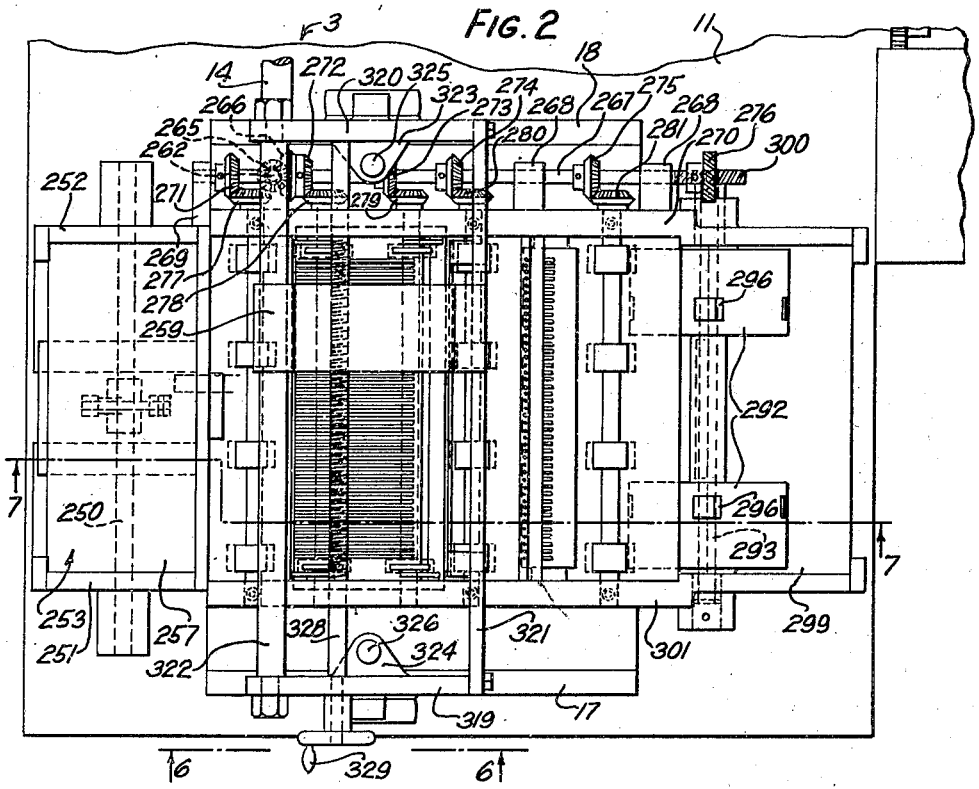
Fig. 2 is a plan view of that portion of the machine which handles the item cards and should be placed below Fig. 1 to form a complete plan view of the item and file card sensing mechanisms in their respective positions.

Referring now to the drawings wherein like reference characters designate the same parts throughout the several views, particular reference being had to Figs. 1 and 2, there is shown a file card sensing mechanism 1, a file card perforating mechanism 2, an item card sensing mechanism 3, and a register mechanism 4. The register mechanism 4 is shown (Fig. 1) as being enclosed in a housing, the details of the register being shown in Figs. 3 and 10. In order to simplify the disclosure, each of the four mechanisms mentioned above will be described as separate units, and the electrical circuits which control the operation thereof will be described in detail in connection with the discussion of the operation of the entire system.

The power supply for driving all of the mechanical units of the system is derived from a motor (not shown) suitably secured to the underside of a base plate 11 on which the entire system is mounted. This base plate may be of any suitable type such as a metal table or bench, and the motor may be secured thereto in any known manner for driving a belt 12 which passes around a sheave 13 fixed to a main drive shaft 14.

Secured to the base 11 and extending upwardly therefrom are a pair of side plates 15 and 16 which support the file card sensing mechanism 1 and file card perforating mechanism 2, and a pair of side plates 17 and 18 which support the item card sensing mechanism. The main drive shaft 14 is journaled in the side plates 15 and 16 and through clutch mechanisms and gear trains drives all of the moving parts of the system. Positioned on the main drive shaft 14 between the side plates 15 and 16 is a clutch member 19 (Fig. 9) which is pinned to the shaft at 20 and rotates therewith for driving a cooperating clutch member 26 which is slidably keyed at 27 to a collar 28 formed integral with a gear 29 and is freely rotatable on the shaft 14. The left end (Fig. 9) of the collar 28 abuts the right face of the clutch member 19 and is held in position thereagainst by a collar 30 pinned to the shaft and engaging the right face of the gear 29. A plurality of compression springs 31 normally urge the clutch member 26 to the left and into engagement with the teeth of the clutch member 19, the clutch member 26 being held out of engagement with the clutch member 19 by a stop 32 positioned on the armature 33 of an electromagnet 34 mounted upon the upper surface of the base plate 11. The stop member 32 is adapted to engage one of three camming slots 35 formed in the peripheral surface of the clutch member 26 when the magnet 34 is deenergized to cam the clutch member 26 out of engagement with the clutch member 19 and stop the rotation of the gear 29. When the electromagnet 34 is energized momentarily, the armature 33 will be drawn downward (Fig. 9) to withdraw the stop member 32 from the camming slot 35 thereby to permit the compression springs 31 to force the clutch member 26 to the left into engagement with the clutch member 19, and as soon as the electromagnet is deenergized the stop member will be permitted to move into engagement with the peripheral surface of the clutch member 26, on which surface the stop member will ride until it strikes one of the camming slots 35 whereupon it will be forced into the slot and will cam the clutch member 26 to the right out of engagement with the clutch member 19.

Journaled in the side plates 15 and 16 is a shaft 41 (Fig. 9) having fixed thereto a gear 43 which meshes with the gear 29 and through the shaft 41 drives a file card sensing head designated generally by the numeral 45. A second gear 46 (Figs. 4 and 9) meshes with the gear 29 and is mounted to rotate upon a stud 47 secured to an upright bracket 48 mounted upon the base 11. The gear 46 has pinned eccentrically to the right side thereof one end of a link 49, the other end of which is pivoted intermediate the ends of a lever 50 (Fig. 4) mounted to rock upon a shaft 51 mounted in a base 52 of a file card magazine designated generally by the numeral 53. The lever 50 has pivoted to the upper end thereof one end of a link 54, the other end of which is pivotally secured to a downwardly extending projection 55 of a card feed finger 56 reciprocably mounted in the bottom of the file card magazine 53 and provided with a card engaging portion 57. Upon rotation of the gear 29, it will be apparent that the gear 46 will be rotated about the stud 47, and since the link 49 is pivoted to the gear 46 eccentrically thereof, an oscillating motion will be imparted to the lever 50 which will in turn cause the card feed finger 56 to be advanced to the right (Fig. 4) and retracted to the position shown, once for each complete revolution of the gear 46.

The card engaging portion 57 of the card feed finger 56 is adapted to engage the bottom one of a plurality of cards 66 stacked in the magazine to advance the card to the right (Fig. 4) through a slot 67, the vertical dimensions of which may be accurately regulated by means of a barrier 68 adjustably secured to the right side (Fig. 4) of the file card magazine 53 for permitting only one card at a time to be moved from the bottom of the stack in the magazine. Thus, upon momentary operation of the electromagnet 34 the gear 29 will be driven through a part of a revolution to rotate the gear 46 through a complete revolution to cause a reciprocation of a card feed finger 56 to advance the card from the bottom of the stack in the magazine out through the slot 67. It is to be noted at this time that the card is advanced with its "nine" hole position first. The card, upon being advanced through the slot 67, will be moved into engagement with cooperating card feed rollers 75 and 76 (Fig. 4) which will advance the card along a predetermined path as will now be described in detail.

The main drive shaft 14, as will be apparent by reference to Fig. 9, has secured thereto a beveled gear 77 which meshes with a beveled gear 78 secured to a vertically extending shaft 79 journaled in a bracket 80 secured to the side plate 15. The upper end of the shaft 79 carries a beveled gear 81 which in turn meshes with a beveled gear 82 mounted upon a horizontally extending shaft 83. The horizontally extending shaft 83 (Fig. 1) is mounted in brackets extending outwardly from a main supporting bracket 84 mounted on the side plate 15 and extends substantially the entire length of the side plate 15. This shaft 83 has secured to it a plurality of beveled gears 85, 86, 87, 88, 89, 90, 91, 92, 93, 94, and 95 (Fig. 1) which mesh with and drive continuously beveled gears 96 to 106, inclusive, respectively. The gears 96 to 106, inclusive, are mounted upon shafts 107 to 117, inclusive, (Figs. 4 and 5) respectively, journaled in the bracket 84 secured to the side plate 15 and a corresponding bracket 118 secured to the side plate 16.

The card feed roller 75 (Fig. 4) is mounted on the shaft 107 and card feed rollers 125 to 134, inclusive, (Figs. 4 and 5) are mounted on the shafts 108 to 117, inclusive, respectively. The card feed rollers 75, 127, 128, 129, 130, 131, and 134 have cooperating therewith the card feed roller 76 and upper card feed rollers 135, 136, 137, 138, 139, and 140, respectively, which are mounted on shafts 145, 146, 147, 148, 149, 150, and 151, inclusive, extending between the brackets 84 and 118. These shafts 145 to 151 are all supported in the same manner and therefore the means for supporting only one of them will be described in detail. For example, the shaft 146 (Fig. 4) is journaled in a journal block 152 mounted in a slot 153 formed in the bracket 118. A coil spring 154 urges the block 152 downwardly and tends to force the upper card feed roller 135 into engagement with the lower card feed roller 127. A similar construction is provided in the bracket 84 and the shaft 146 extends into journal blocks mounted in the brackets 84 and 118. The remainder of the upper card feed rollers which cooperate with the lower card feed rollers 125, 126, 132, and 133, will be described in detail hereinafter.

From the description of the apparatus up to this point it will be apparent that a card from the bottom of the stack of cards in the file card magazine 53 will be picked up by the card engaging portion 57 of the card feed finger 56, and advanced through the slot 67 in the magazine 53 and into engagement with the card feed rollers 75 and 76 which will advance the card until it encounters an obstruction in its path, as will be described hereinafter.

The file card sensing head 45 is reciprocated each time the shaft 41 makes one complete revolution since the shaft 41 carries at its ends a pair of eccentrics 161 (Figs. 4 and 9) which have cooperating therewith collars 162 (Figs. 4 and 9) having extending upwardly therefrom drive rods 163. The upper ends of the drive rods 163 are pinned at 164 to the file card sensing head 45. The file card sensing head comprises a rectangular framework composed of end pieces 165 and 166, a cross member 167 and a cross bar 168 (Figs. 1, 4, and 9). The end pieces 165 and 166 as shown in Fig. 9 have extending downwardly therefrom apertured guide sleeves 169 and 170, respectively, through the apertures in which guide rods 171 and 172 extend, the guide rods being mounted upon and extending upwardly from extensions 173 and 174 formed integrally with the side plates 15 and 16, respectively.

Slidably mounted on the cross member 167 and the cross bar 168 is a sensing pin supporting member 176 (Figs. 4 and 9) having a threaded aperture 177 adapted to be threadedly engaged by a positioning screw 178 journaled in the end pieces 165 and 166 and provided at its right end (Fig. 9) with an actuating handle 179. As the description progresses, the purpose of the positioning screw 178 and its actuating handle 179 will become apparent.

Secured to the underside of the sensing pin supporting member 176 are a pair of blocks 180 and 181 (Fig. 4) to which is secured a plate 182 of insulating material forming a part of a pin box designated generally by the numeral 183. The pin box 183 comprises a pair of side plates 184 and 185 secured at their upper ends to the underside of the plate 182 and having fixed to their lower ends a plate of insulating material 186.

Positioned in the pin box 183 (Figs. 4 and 9) with their ends extending beyond the plate 182 and the plate 186, are a plurality of sensing pins 190 having enlarged portions 191 for engaging the upper surface of the plate 186 and reduced portions 192 and 193 extending through apertures 194 and 195 in the plates 186 and 182, respectively. Coil springs 196 encircle the upper ends of the pins and engage the underside of the plate 182 and a shoulder formed by the enlarged portion 191 thereof for normally urging the pins downwardly.

In the particular machine chosen for illustration, there are provided 66 of these pins arranged in 6 columns of 11 each for cooperating with 6 metallic contact bars 198 of a group of 45 metallic contact bars set into a plate 199 of insulating material. The plate 199 of insulating material is mounted in the brackets 84 and 118 and has the 45 contact bars 198 positioned therein in such a manner as to lie directly under the 45 rows of hole positions in a statistical card. The pin box 183 may be shifted to the right or left (Fig. 9) by manipulating the actuating handle 179 so as to associate the pin box with any 6 successive contact bars 198, one turn displacing the pin box the space of one card column to right or left.

The lower card feed rollers 125 and 126 (Fig. 4) extend through slots formed in the plate 199 and cooperate with upper card feed rollers 211 and 212 (Fig. 4), respectively, which are freely rotatable on the ends of bell crank levers 213 and 214, respectively, pivoted at 215 and 216 to the brackets 84 and 118 and having their upper ends urged towards each other by coil springs 217 and 218, respectively, for normally urging the rollers 211 and 212 downwardly into engagement with the card feed rollers 125 and 126.

A slot 219 formed in the plate 199 and extending throughout the length of the plate is adapted to receive the end of a plunger 220 (Fig. 4) when there is no card in position under the file card sensing head 45. When a card is in position under the sensing head the plunger 220 will engage the card and be moved upwardly to close a circuit between electrical contacts 221 and 222 suitably mounted on the plate 182 (Fig. 4).

Mounted to reciprocate with the sensing head 45 is a card stop 223 (Figs. 4 and 9) which is secured to the end pieces 165 and 166 of the file card sensing head, and upon reciprocation of the sensing head this card stop 223 will be moved downwardly with the sensing head in timed relation to the advancement of a card from the file card magazine 53 under the file card sensing head 45 and its lower end will be placed in the path of the card to stop it from advancing out of the sensing head. A card which has encountered the card stop 223 will be so positioned as to cause a relative upward movement of the plunger 220 (Fig. 4) with respect to the file card sensing head 45 upon the head being moved downward to complete a circuit between the contacts 221 and 222. The trailing end (Fig. 4) of a card which has encountered the card stop 223 will lie to the right of the extreme left hand row of sensing pins 193 so that these pins will engage the contact bars 198 with which the sensing head 45 is associated with each downward operation of the sensing head 45. The 10 right hand rows of sensing pins (Fig. 4) having pins which encounter apertures in the card thereunder will pass those pins through the card and make contact with the contact bars 198 with which they are associated to complete an electrical circuit, as will be described in detail hereinafter.

The next time the electromagnet 34 is operated, the card feed finger 57 will select a new card from the bottom of the file card magazine and advance it toward the file card sensing head 45, and the file card sensing head in moving upwardly will carry with it the card stop 223 moving it out of the path of the card under the sensing head, which card will then be advanced by the card feed rollers which are rotating continuously and the new file card will be positioned under the sensing head. The path of the file card, after it leaves the file card sensing head, will be determined by the circuits completed by the mechanism positioned in the file card sensing head, two alternate paths being provided for the card depending upon whether the card has perforated therein in a position under the sensing pins a number which corresponds to a number in a similar area of an item card which is being simultaneously sensed or whether a number which does not correspond to the number in the sensed area of the item card, and these paths remain open until a card is advanced past the point where the paths divide.

Figure 6:
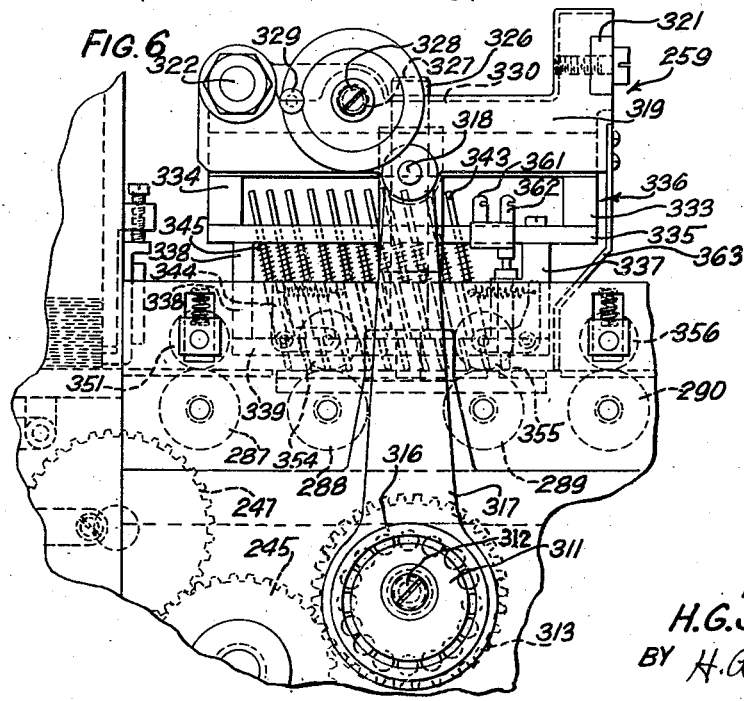
Fig. 6 is an end elevational view of the item card sensing mechanism taken along the line 6—6 of Fig. 2 in the direction of the arrows.

The item card sensing mechanism 3 as shown in Figs. 2, 6, and 7, is substantially the same as the file card sensing mechanism 1 and is driven from the main drive shaft 14 which has, as will be seen by reference to Fig. 7, positioned thereon between the side plates 17 and 18 a clutch mechanism 241 for connecting item card feeding and sensing mechanisms to the shaft 14 at predetermined intervals. It will be noted at this time that the item feeding and sensing operations are carried on at one-third the speed of the sensing and feeding of the file cards since obviously there will be a larger number of file cards than item cards to be compared. This difference of speed in the feeding of cards will be apparent by comparing Figs. 4 and 7, particularly the gearing for picking cards from the magazine and sensing them.

It was mentioned in connection with the feeding and sensing of the file cards that there were provided, in the movable clutch member 26, three camming slots into which the stop 32 might be moved. The construction of clutch 241 is the same as the clutch which operates the file card feeding and sensing mechanisms except that there is provided in the periphery of the movable clutch member only one camming slot for stopping the rotation of the clutch, and the gear ratio arrangement provided for the item card sensing mechanism is such that for each rotation of the shaft 14 during which the faces of clutch 241 are engaged, one card will be sensed by the item card sensing station, whereas if the cards sensed by the file card sensing station do not correspond to those sensed in the item card sensing station, three cards will be sent through the file card sensing station during one revolution of shaft 14.

The clutch 241 is operated by an electromagnet 242 (Fig. 7) having an armature 243 carrying a stop member 244 which, upon energization of the electromagnet 242, permits the clutch 241 to drive a gear 245 through one complete revolution. Freely rotatable upon a stud shaft 246 mounted on a bracket 240 extending upwardly from the base plate 11, is a gear 247 which meshes with the gear 245, and has pivoted eccentrically thereon one end of a link 248. The other end of the link 248 is pivoted intermediate the ends of a lever 249 which in turn is oscillatable upon a shaft 250 mounted in the lower portion of side plates 251 and 252 of an item card magazine 253. Pinned to the upper end of the lever 249 is a link 254 connected to a depending portion 255 of an item card feed finger 256 which is adapted to engage the lowermost card of a stack of cards 257 positioned in the magazine 253 and advance it, with the "nine" hole position first, through a slot 258 upon oscillation of the lever 249 due to the rotation of the gear 247.

After an item card 257 has been advanced through the slot 258, it will be engaged by a chain of card feed rollers continuously driven from the main drive shaft 14, and will be fed under an item card sensing head designated generally by the numeral 259. The card feed rollers for advancing the item cards are driven from the main shaft 14 by the following mechanism. Secured to the side plate 16 is a journal block 261 (Fig. 7) in which there is positioned a shaft 262 having a beveled gear 263 formed on the lower end thereof and meshing with a beveled gear 264 fast to the shaft 14. The upper end of the shaft 262 carries a beveled gear 265 which meshes with a beveled gear 266 pinned to a horizontally extending drive shaft 267 (Figs. 2 and 7). The drive shaft 267 is journaled in brackets 268 and 269 extending outwardly from a main supporting bracket 270 secured to the side plate 16. Mounted upon the drive shaft 267 are a plurality of beveled gears 271, 272, 273, 274, 275 and a spiral gear 276 (Fig. 2). The beveled gears 271 to 275, inclusive, mesh with beveled gears 277, 278, 279, 280, and 281, inclusive, respectively, and the spiral gear 276 meshes with another spiral gear 300. The beveled gears 277, 278, 279, 280, and 281 are mounted upon shafts 282, 283, 284, 285 and 286, (Fig. 7), which have fixed thereto lower card feed rollers 287, 288, 289, 290, and 291, respectively, and the spiral gear 300 is pinned to a pair of drums 292 rotatable about a shaft 293 fixed in the main supporting bracket 270 and a bracket 301 which is secured to the side plate 17. The shafts 282 to 286 are journaled in the main supporting bracket 270 and the bracket 301.

The card feed rollers just described are, as pointed out hereinbefore, constantly driven and cooperate with upper card feed rollers to be described in detail hereinafter, which hold the card firmly in position between the sets of rollers for advancing it.

The shaft 293 (Fig. 7) has pinned thereto cams 294 for cooperating with cam levers 295 having card gripping fingers 296 extending through the periphery of the drums 292. The cam levers 295 are urged into engagement with the cam 294 by coil springs 297 and are pivoted to the sides of the drums 292 at 298. This last described structure is the conventional type of card pickup drum for depositing cards in a card receptacle 299 of the usual type. Shaft 293 and cam 294 do not move, but the card gripping fingers 296 and the drums 292 are moved in timed relation to the advancement of cards thereto so that one of the card gripping fingers 296 associated with each drum 292 will be cammed away from the periphery of the drum and will be in a position to receive a card advanced thereto and clamp it against the periphery of the drum for depositing it in the card receptacle 299 as the drum rotates in a clockwise direction (Fig. 7).

The item card sensing head 259 (Figs. 2, 6, and 7) is an exact duplicate of the file card sensing head 65 and is reciprocated by means of eccentrics 311 mounted upon a shaft 312 having secured thereto a gear 313 which meshes with the gear 245 and is driven thereby. It will be apparent on each rotation of the shaft 312 a complete reciprocation of the item card sensing head 259 will take place; that is, it will be moved upwardly away from a card which has been advanced thereunder and down into engagement with a second card which has been advanced from the magazine by the card feeding mechanism.

The gear 313 will of course be driven in synchronism with the gear 247 since both of them mesh with the gear 245 and for each rotation of the gear 247 to feed a card, the gear 313 will be moved through one complete rotation to disengage the item card sensing head 259 from a card positioned thereunder to permit it to be withdrawn from under the item card sensing head by the card feed rollers and the item card sensing head will then be moved downwardly to engage the card just advanced from the magazine 253.

The item card sensing head reciprocating mechanism includes eccentric collars 316 (Figs. 6 and 7) which cooperate with the eccentrics 311 and have extending upwardly therefrom drive rods 317. The upper end of the drive rods 317 are pinned at 318 to the item card sensing head 259. Like the file card sensing head, the item card sensing head comprises a rectangular framework composed of end pieces 319 and 320, a cross member 321, and a cross bar 322 (Figs. 2, 6, and 7). The end pieces 319 and 320 have secured thereto sleeves 323 and 324 (Fig. 2), respectively, through the apertures of which guide rods 325 and 326 extend, the guide rods being mounted upon and extending upwardly from extensions similar to those shown at 173 and 174 of the file card sensing head, but formed integrally with the side plates 16 and 17, respectively.

Slidably mounted on the cross member 321 and the cross bar 322 is a sensing pin supporting member 330 having a threaded aperture 327 adapted to be threadedly engaged by a positioning screw 328 journaled in the end pieces 319 and 320 and provided with an actuating handle 329. The purpose of the positioning screw 328 and its cooperating parts will become apparent as the description progresses.

Secured to the underside of the sensing pin supporting member 330 are a pair of blocks 333 and 334 (Figs. 6 and 7) to which is secured a plate 335 of insulating material forming a part of a pin box designated generally by the numeral 336. The pin box 336 includes a pair of side plates 337 and 338 (Figs. 6 and 7) secured at their upper ends to the underside of the plate 335 and having fixed to their lower ends a plate of insulating material 339.

In the pin box 336 there are positioned a plurality of sensing pins 343 having their ends extending beyond the plates 335 and 339 and being provided with enlarged portions 344, the lower ends of which engage the plate 339 and the upper ends of which engage compression springs 345 surrounding the pin and in engagement with the plate 335. The compression springs 345 normally tend to maintain the pins 343 in their lowermost position with the enlarged portions 344 engaging the upper surface of the plate 339.

As in the file card sensing head there are 66 of these pins provided, arranged in columns of 11 each, for cooperating with any 6 successive metallic contact bars 346 of a group of 45 metallic contact bars set into a plate 347 of insulating material mounted similarly to the insulating plate containing the metallic contact bars 198 of the file card sensing head.

The pin box 336 may be actuated so as to place the sensing pins 343 in operative association with any 6 metallic contact bars 346 by manipulating the actuating handle 329 so as to rotate the positioning screw 328, one turn of which displaces the pin box one card column's space.

Upper card feed rollers 351, 352, 353, 354, 355, and 356 (Figs. 6 and 7) are associated with the lower card feed rollers 287, 288, 289 and 290 and serve the same purpose in the item card sensing position as do the rollers 76, 211, 212, 135, 75, 125, 126, and 127 in the file card sensing station; that is, they tend to advance a card through the item card sensing station, the lower rollers being constantly driven and the upper rollers being free to rotate with the lower rollers and being normally urged downwardly into engagement therewith for advancing a card through the item card sensing station.

A pair of contacts 361 and 362 (Figs. 6 and 7) are secured to the pin box in the item card sensing head and operate in the same manner as do the contacts 221 and 222 in the file card sensing head, a circuit being completed between the contacts when the item card sensing head 259 is moved downwardly and finds a card positioned thereunder. A card stop 363 similar to the card stop 223 of the file card sensing head is provided in the item card sensing head for stopping a card under the item card sensing head each time the head reciprocates. From the foregoing description of the item card sensing mechanism it will be apparent that it operates in exactly the same manner as does the file card sensing head, there being this exception, however, that due to the gear ratio for driving the two sensing heads from the main drive shaft 14, the item cards will be sensed at one-third the speed of the file cards since, as will be obvious, a file card must be found to correspond with each item card in order to render the system operative and therefore the file cards, unless a card is found which corresponds to the card positioned in the item card sensing head, operates at three times the speed of the item card sensing mechanism. This, however, is the only distinction between the two mechanisms as regards the sensing of cards. The details of operation of these cooperating sensing mechanisms will be described hereinafter in conjunction with the operation of the machine as a whole.

If the item and file card sensing heads 259 and 45, respectively, have not found a file card which corresponds to the item card held in position under the item card sensing head 259 no circuits will have been completed by the sensing pins to energize the electromagnet 242 which was energized once when the machine was started to advance one card into and under the item card sensing head where it is held by the card stop 363. In this event, the file cards will follow a predetermined path until a file card is found which corresponds to the card held in the item card sensing station 259 whereupon that particular file card which agrees with the held item card will be deflected along a different path from the preceding cards.

While searching for a file card, the compared area of which agrees with the compared area of the card held in the item card sensing head 259 successive cards will be picked from the bottom of the file card magazine 53 (Figs. 1 and 4) and advanced under the file card sensing head 45 where they will be compared with the card held in the item card sensing head 259 (Figs. 2 and 7); and if the areas being compared do not agree, the file card sensing head 45 (Fig. 4) will move upwardly and permit the card feed rollers 211, 125, 212, and 126 to advance the card to the card feed rollers 127 and 135 which will direct the card over the upper surfaces of a card deflector 371 to card feed rollers 128 and 136 (Fig. 4), 129 and 137 (Fig. 5) from which rollers the card will be dropped upon a shiftable plate 372 and permitted to descend into a file card receptacle 373 (Fig. 5) which may be of any well known type.

The card deflector 371 is normally in the position shown in Fig. 4 and will thus permit the cards to be directed over it and into the receptacle 373 (Fig. 5). However, whenever the item card sensing head 259 and the file card sensing head 45 find cards which agree, circuits will be completed in the manner described hereinafter to hold the file card in the file card sensing head 45 until an item card is found by the item card sensing head 259, the compared area of which does not correspond with the compared area of the file card, whereupon the file card sensing mechanism will be operated and the card deflector 371 will be raised to direct the file card downwardly into engagement with card feed rollers 377 and 378 (Fig. 4). When this occurs, the card deflector 371 will be moved to the position shown in Fig. 4 and the shiftable plate 372 (Fig. 5) will be raised and held in its raised position until a new file card is perforated and sent to the receptacle 373. The shiftable plate 372 will thus hold all of the file cards advanced thereto while the perforating mechanism is perforating a new card and until the new card is advanced to the receptacle 373, at which time it will be permitted to drop and discharge the cards which it held into the receptacle 373 in their proper order on top of the newly perforated card. The mechanism for operating the shiftable plate will be described in detail in conjunction with the description of the circuits for controlling the system.

The card deflector 371 comprises a C-shaped member 385 (Fig. 4) hinged to the shaft 111 and having extending upwardly from its horizontal portion an arm 386 to which and to the bracket 118 a contractile spring 387 is secured for normally urging the horizontal portion of the C-shaped member 385 into engagement with a stop member 388 so that cards being passed through the file card sensing head will normally be directed to the receptacle 373 (Fig. 5). However, upon completion of the circuits just mentioned, an electromagnet 389 will be energized and through a link 390 interconnecting its solenoid 391 and the arm 386 will tilt the C-shaped member 385 upwardly to deflect the next card coming from the file card sensing head downwardly into engagement with the rollers 377 and 378.

Beneath the card feed roller 377 are card feed rollers 379, 392, 393, and 394 and beneath the card feed roller 378 are card feed rollers 395, 396, and 397 for directing a card advanced thereto downwardly to a pair of card picker drums 398 (Fig. 4), which deposit the cards in a receptacle (not shown) positioned beneath the drums 398. The card picker drums 398 and their associated receptacle are of the same construction as the card picker drums 292 and the receptacle 299 described in connection with the item card sensing head card feeding system and a detailed description thereof is not believed to be necessary.

The card feed rollers 378, 395, 396, and 397 (Fig. 4), are mounted upon shafts 405, 406, 407, and 408, respectively, and are positively driven, the shafts 405 to 408, inclusive, being journaled in the side plates 15 and 16. Fixed to shafts 405, 406, 407, and 408 (Fig. 15) are worm gears 409, 410, 411, and 412 which mesh with worm gears 413, 414, 415, and 416, respectively, fixed to a shaft 417 journaled in brackets 418 and 419 secured to the side plate 15 and carrying at its upper end a beveled gear 420 meshing with a beveled gear 421 pinned to the shaft 83. The drum 398 is mounted upon a shaft 422 also journaled in the side plates 15 and 16, and is driven by a worm 423 mounted upon the end of the shaft 417 and meshing with a worm gear 424 secured to the shaft 422.

The card feed rollers 377, 379, 393, and 394 (Fig. 4) are not positively driven and serve to maintain the cards in operative relation with the driven card feed rollers 378, 395, 396, and 397. The card feed rollers 379, 392, and 394 serve to complete electrical circuits due to the operation thereby of pairs of contacts 380 and 381, 382 and 383, 431 and 432, 430, 433, and 434, when a card is passed under the rollers, contact between contacts 380 and 381 and between 382 and 383 being caused by a card engaging roller 379, contact between contacts 431 and 432 being caused by a card engaging roller 392, and contact between contacts 430, 433, and 434 being caused by a card engaging roller 394. This is accomplished by mounting the rollers 379, 392, and 394 on arms of bell cranks 384, 435, and 436, respectively, pivoted on the shafts of the card feed rollers 377 and 393 and normally urged toward the driven rollers by springs 449, 437, and 438, respectively, pins 450, 439, and 440 being provided by the horizontally extending arms of the bell cranks 384, 435, and 436, respectively, for operating the contacts.

Positioned in horizontal alignment with the card feed rollers 395 and 397 are a series of brushes 441 and 442, each series containing 45 brushes which, when a card is advanced past the rollers, will be in direct alignment with the 45 rows of possible perforations. These brushes cooperate with the rollers 395 and 397 which are made of metal and which serve as sensing drums to complete electrical circuits as will be described in detail in connection with the description of the circuit connections for the entire machine.

The just described sensing brushes 441 and 442 and card feed rollers 395 and 397 (Fig. 4) operate various electrical apparatus in cooperation with a sensing drum 443 (Fig. 7) and a row of 45 brushes 444 (Figs. 2 and 7) in the item card mechanism, to control the electrical circuits when cards which have been compared by the file and item card sensing heads have been found to agree, and are moved past the brushes. Only those brushes 441, 442 or 444 which will engage the cards in the area wherein there is perforated data representing amounts to be computed are connected in the circuit. The means for interconnecting the brushes with the circuit is not shown since any known means may be used and in the circuit diagram (Fig. 14) only seven of each set of brushes are shown and these are shown as permanently connected.

In the item card sensing mechanism adjacent the sensing drum 443 and its associated brushes 444 (Fig. 7) there are provided a plurality of card actuated contacts 445, 446, 447, 448, 449, and 450 which are adapted to be operated by a card in its passage to the sensing drum. Two card rollers 451 and 452 mounted on bell crank levers 453 and 454, respectively, engage the card in its passage to the sensing drum 443 and rock their respective bell cranks about a common pivot 455 mounted on the bracket 270. The bell crank 454 will be actuated first and will, through its upwardly extending arm, cause the contact 449 to engage the contact 450 to complete an electrical circuit between them for a reason which will be apparent as the description progresses. In a like manner, the card at approximately the time it engages the sensing drum 443 will actuate the bell crank 453 and move the contacts 445 and 447 into engagement with the contacts 446 and 448, respectively.

Each time in the operation of the mechanism thus far described that a file of card has been found, the compared area of which agrees with the compared area of the item card, an addition to or a withdrawal from stock is indicated and a new file card must be prepared to replace the file card which is thus superseded. The new file card to be prepared must indicate the algebraic sum of the amount of stock on hand as represented by the old file card and the amount of stock added to or withdrawn from the supply. The perforating mechanism indicated generally by the numeral 2 will prepare a new card under control of the electrical circuits which in turn are controlled by the file and item card sensing mechanisms and the sensing drums and brushes heretofore mentioned, in cooperation with the card operated contacts heretofore described.

The file card perforating mechanism 2 will now be described in detail: Positioned at the extreme right end of the brackets 84 and 118 (Fig. 1) is a blank card magazine 475 for holding a supply of imperforate cards 476 from which a card will be drawn at predetermined intervals as controlled by the operation of the file and item card sensing mechanisms. The various parts of the file card perforating mechanism are actuated in synchronism with the operation of the file and item card sensing mechanisms and receive their actuating force from the main drive shaft 14 through an auxiliary drive shaft 477 (Fig. 1) journaled in brackets 478 and 479 mounted on the base plate 11. The shaft 477 at its left end carries a beveled gear 480 which meshes with a beveled gear 481 secured to the shaft 14, and the shaft 477 carries at its right end a second beveled gear 482 meshing with a beveled gear 483 mounted upon a shaft 484 journaled in the side plates 15 and 16 (Figs. 1, 8, and 11).

Referring now particularly to Figs. 1, 5, 8, and 11, the shaft 484 has fixed thereto intermediate its ends a driving clutch member 485 (Fig. 8) and has rotatably mounted thereon a gear 486 to which there is attached a movable clutch member 487 adapted to be driven by the clutch member 485 through one revolution under control of an electromagnet 488 mounted on the base plate 11 and having its armature 489 adapted to enter a slot 490 in the clutch member 487. This single revolution clutch which will be referred to hereinafter as the perforator clutch 491 is substantially the same as the clutches through which the item and file card mechanisms are driven. The perforator clutch is adapted to engage upon momentary energization of the electromagnet 488 and to remain engaged for one complete revolution whereupon the movable clutch member 487 will be cammed out of engagement with the driving clutch member 485 by a stop 492 mounted on the armature 489 and adapted to engage the slot 490 of the clutch member 487. Meshing with the gear 486 is a gear 501 (Figs. 5 and 8) mounted upon a shaft 502 journaled in the side plates 15 and 16 and a gear 503 rotatable on a stud shaft 504 mounted on a bracket 505 which in turn is mounted upon the base plate 11. There is pinned eccentrically of the gear 503 one end of a link 506, the other end of which is pinned to a rocker arm 507 pivoted to the side plates 15 and 16. The upper end of the rocker arm 507 has a link 508 pivotally secured thereto which is also pivoted to a depending portion 509 of a card picker finger 510 slidably mounted in the bottom of the magazine 475 and operable similarly to the card picker fingers of the item and file card magazines.

Figure 8:
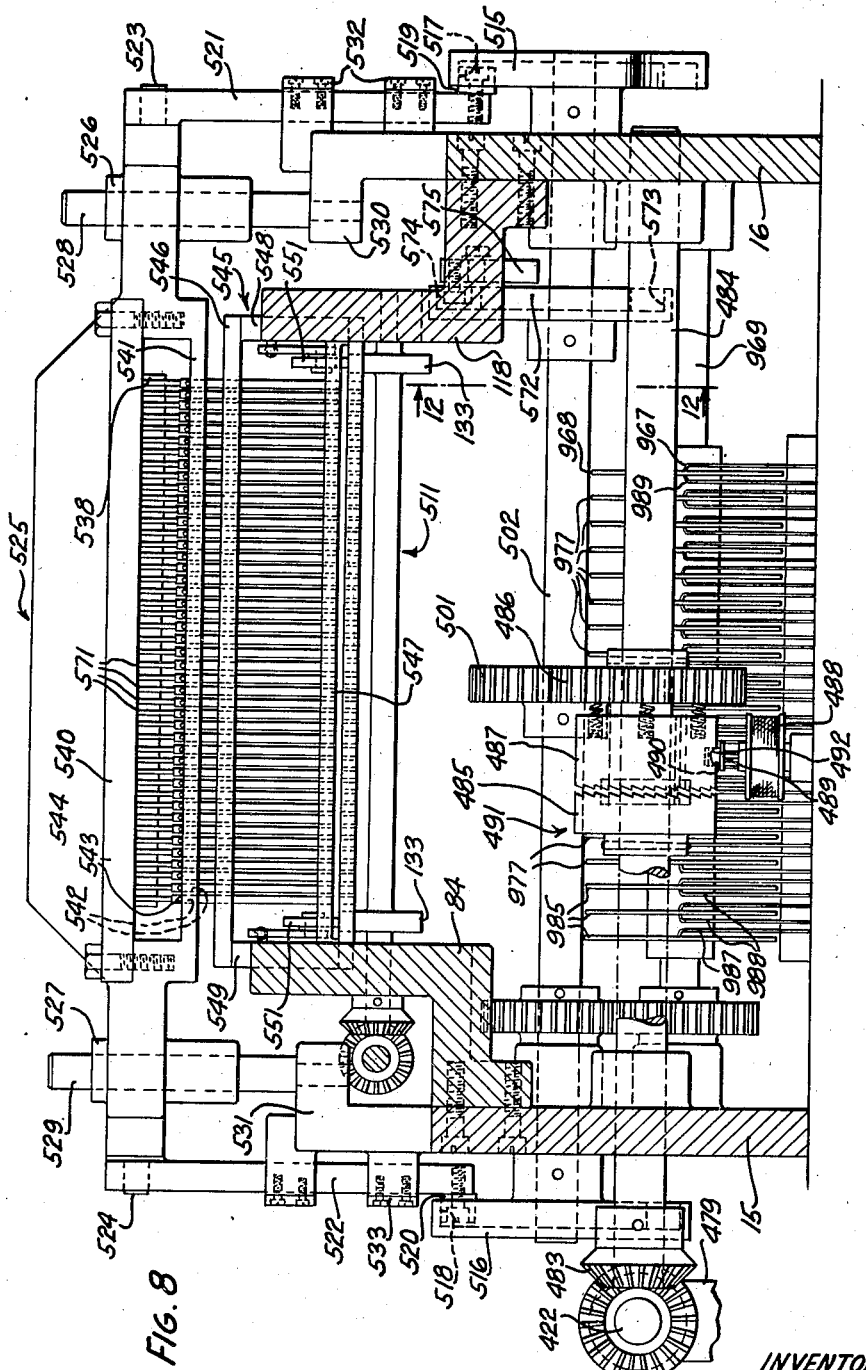
Fig. 8 is a vertical sectional view taken along the line 8—8 of Fig. 5 in the direction of the arrows.

It will be apparent that each time the gear 486 moves through one complete revolution, the gear 503 will also pass through one complete revolution, and will actuate the card picker finger 510 to advance a card 476 from the bottom of the magazine 475 to the feed rolls 134 and 140 which will further advance the blank card into a perforator head indicated generally by the numeral 511 (Figs. 5, 8, and 11).

Each time a card is advanced to the perforator head 511 the head will be reciprocated through the operation of the shaft 502 which will be rotated through one revolution due to its interconnection with the shaft 484 by means of the clutch 491 and the gears 486 and 501. Fixed to the outer ends of the shaft 502 are a pair of cams 515 and 516 (Figs. 8 and 11) provided with cam grooves 517 and 518, respectively, in which travel cam rollers 519 and 520, respectively, secured to the ends of reciprocable bars 521 and 522. The upper ends of the bars 521 and 522 are pinned at 523 and 524 to a ram indicated generally by the numeral 525. The ram 525 is provided with bearings 526 and 527 which surround guide pins 528 and 529 mounted upon brackets 530 and 531, respectively. The bars 521 and 522 are slidably mounted in guides 532 and 533, respectively, and it will be apparent that upon their being moved by the cams 515 and 516 the ram 525 will be reciprocated on its guide pins 528 and 529.

The central portion (Figs. 5 and 8) of the ram 525 is formed in two sections; a driving plate 540 and a stripper plate 541. The driving plate 540 has formed on the underside thereof a depending portion 538 slotted as shown at 539, there being 45 slots in the portion 538 which extend from the front to the back thereof (Fig. 8). In the stripper plate there are provided a plurality of apertures 542, 450 in number, which are arranged in 45 columns of 10 apertures each, and in each of which there is slidably suspended a perforating pin 543 having a pin 544 therein which normally rests upon the upper surface of the stripper plate 541.

Positioned directly below the ram 525 and mounted on the brackets 84 and 118 (Fig. 8) is a perforating pin guide box 545 comprising a top guide plate 546, a lower guide plate 547, and side plates 548 and 549. The guide plates 546 and 547 each have 450 apertures therein in direct alignment with the apertures in the stripper plate 541 and serve to guide the perforating pins 543 when they are actuated. The lower guide plate 547 is spaced upwardly slightly from the bottom edge of the side plates 548 and 549 to permit the passage of a card between it and a die plate 550 secured to the lower surfaces of the side plates 548 and 549, which die plate is provided with apertures in alignment with the apertures in the stripper plate 541 and the guide plates 546 and 547 so that if a card is in position in the perforator head 511 and one or several of the perforating pins are driven downwardly by the ram 525 in the manner to be described hereinafter, they will perforate a hole or holes in the card.

Upper card feed rollers 551 and 552 (Figs. 5 and 8) are mounted on horizontally extending arms 553 and 554 of bell crank levers 555 and 556, pivoted to the side plates 548 and 549 at 557 and 558, respectively. Vertically extending arms of the bell crank levers 555 and 556 are normally urged toward the center of the perforator head 511 (Fig. 5) by contractile springs 559 and 560. The card feed rollers 551 and 552 cooperate with the positively driven card feed rollers 133 and 132, respectively, and will tend to advance a card which has been directed thereto by the card feed rollers 134 and 140 through the perforator head 511. However, there is secured to the ram 525 at its left side (Fig. 5) a card stop 561 which, when the ram is moved downwardly will be interposed in the path of the card and will prevent the card from being advanced out of the head until the ram is moved upwardly at the completion of a punch stroke, a portion of the card stop 561 being adapted to be moved into the path of the card between the die plate 550 and the lower guide plate 547. When the ram 525 moves upwardly carrying with it the card stop 561, a card which has been perforated will be advanced by the card rollers to the left (Fig. 5) and into engagement with a deflecting member 562 into the receptacle 373, the plate 372 always being held in the position shown by the dotted lines when a card is moved from under the perforator 511.

The selection of perforating pins for actuation by the ram 525 is accomplished by providing a selector bar 571 for each of the 45 columns of perforating pins and by providing mechanism for selectively advancing this selector bar through predetermined distances to select a pin for actuation. The selection of perforating pins for actuation is determined and controlled by the sensing brushes and rollers provided in the file card sensing station and the register 4, the amount of advancement of the selector bar determining which particular pin in the column of 10 pins associated with that particular bar is to be actuated.

Secured to the shaft 502 adjacent the side wall 16 is a cam 572 provided with a cam groove 573 in which is positioned a cam roller 574 (Figs. 5, 8, and 12) mounted on the end of a lever 575 pivotally mounted in the bracket 118. The end of the lever 575 away from the cam roller 574 is slotted as shown at 576 for receiving a pin 577 attached to a reciprocable rack 578 (Figs. 1 and 5) which is slidable in brackets 579 and 580. The rack 578 meshes with a gear 581 mounted upon a shaft 582 journaled in upwardly extending portions 583 and 584 of the brackets 84 and 118. Secured to the shaft 582 is a segmental gear 585 into engagement with which a rack 586 formed on the end of each of the selector bars 571 may be moved for actuating the bars 571. The selector bars 571 are each positioned in the slots 539 formed in the depending portion 538 of the driving plate 540 at their right ends and and are supported at their left ends on a cross bar 587 mounted in the upwardly extending portions 583 and 584 of the brackets 83 and 118, a comb-like member 588 being secured to the right face (Fig. 5) of the cross bar 587 and serving as a guide for the selector bars 571.

When the selector bars are in their normal position as shown in Fig. 5, a notch 589 formed therein engages a similarly shaped portion of the cross bar 587 and in this position the racks 586 are out of mesh with the segmental gear 585. Upon completion of circuits, in a manner to be described hereinafter, running to a plurality of electromagnets 595, the electromagnets will be energized and armatures 596 associated therewith will be attracted and their lower ends will move bell crank levers 597 in a counterclockwise direction about a common pivot 598. There is one bell crank lever 597 provided for each electromagnet of which there are 45 corresponding to the 45 selector bars 571. Each bell crank lever carries at its lower extremity a selector bar engaging pin 599 which will move the selector bar associated therewith into engagement with the segmental gear 585 for advancing it into association with a predetermined perforating pin 543. A comb shaped member 600 is provided to serve as a guide for the lower end of the bell crank levers 597 and is secured to the underside of the cross bar 587. Each of the bell crank levers is normally urged in a clockwise direction by a contractile spring 601 associated therewith which normally tends to maintain the bell crank levers in the position shown in Fig. 5. However, upon momentary energization of any one of the electromagnets 595 its associated bell crank lever will be actuated and will move its associated selector bar into engagement with the segmental gear 585. These electromagnets 595 are energized momentarily and at different times in the cycle of rotation of the segmental gear 585 in a counterclockwise direction, and the time of energization of the magnets as pointed out hereinbefore determines the distance through which the selector bar 571 will be advanced to the right (Fig. 5) thereby determining which one of the perforating pins 543 associated with that particular bar will be actuated.

The under surfaces of the selector bars 571 have depending portions 602 which tend to maintain the selector bars in engagement with the segmental gear 585 from the time of energization of the electromagnets 595 until the segmental gear 585 has rotated in a clockwise direction to return the bars to their normal position as shown in Fig. 5, at which time they will be cammed out of mesh with the segmental gear 585 by the upwardly extending portion of the cross bar 587.

The register 4 (Figs. 1 and 3) which is operated under control of the file and item cards in passing the sensing rollers associated therewith and which controls some of the electromagnets 595 for selecting perforating pins for actuation, is driven from the shaft 477 by means of a gear 611 which meshes with an idler gear 612 mounted upon a stud shaft 613 secured to a bracket 614 which in turn is mounted upon a register end plate 615 extending upwardly from the base plate 11. Meshing with the idler gear 612 is a driving gear 616 mounted upon a shaft 617 journaled in the bracket 614 and a supporting arm 618 extending upwardly from a horizontal portion of the bracket 614. A driving clutch member 622 is secured to the right end (Fig. 3) of the shaft 617 and cooperates with a driven clutch member 623 mounted upon a shaft 624. The shaft 624 is journaled in the register end plate 615 and a second end plate 625 between which there are a plurality of intermediate plates 626, 627, 628, 629, 630, and 631 on which are mounted the different units of the register. The clutch, of which the driving clutch member 622 and driven clutch member 623 form a part, is of the single revolution type and of the same construction as the other single revolution clutches described hereinbefore in connection with the mechanism for driving the item and file card sensing mechanisms and the file card perforating mechanism. The clutch is controlled by an electromagnet 632 which, upon momentary energization, will permit the driving and driven clutch members to engage and will automatically cam the driven clutch member 623 out of engagement with the driving clutch member 622 at the completion of a single revolution of the shaft 624. The right end (Fig. 3) of the shaft 624 carries a gear 640 meshing with an idler gear 641 mounted upon the end plate 625 and the idler gear 641 in turn meshes with a gear 642 secured to a shaft 643 which extends through and is journaled in the intermediate plates 626 and 631 and the end plates 615 and 625.

The shaft 643 has rotatably mounted thereon a plurality of register contact disks 644, 645, 646, 647, 648, 649, and 650 representing the units (U) register, tens (T) register, hundreds (H) register, thousands (TH) register, ten thousands (TT) register, hundred thousands (HT) register and millions (M) register, respectively. The contact disks 644 to 650 are exactly the same in construction and have associated therewith contact brushes in the following order: Contact disk 644 has associated therewith brushes 660, 661, 662, contact disk 645 has associated therewith brushes 663, 664, 665, contact disk 646 has associated therewith brushes 666, 667, 668, contact disk 647 has associated therewith brushes 669, 670, and 671, contact disk 648 has associated therewith brushes 672, 673, 674, contact disk 649 has associated therewith brushes 675, 676, and 677, and contact disk 650 has associated therewith brushes 678, 679, and 680, respectively. Since the construction and arrangement of brushes and contact disks are exactly the same for all of the registers from units (U) to millions (M), inclusive, only the contact disk 650 associated with the millions (M) register will be described in detail. The disk 650 comprises a base 686 of insulating material having secured to the opposite surfaces thereof irregularly shaped plates 687 and 688 (Figs. 16 and 17). The plates 687 and 688 are attached to the disk 686 and to each other by copper rivets 689 and the plates are also formed of copper or a similar good electrical conductor and serve to complete circuits between the brushes 678, 679, and 680, selectively, depending upon the position of the disks with respect to the brushes. As shown in Figs. 16 and 17, the contact disk 650 is in its normal position and it will be apparent that in its normal position or in any other rotative position the brush 679 will engage the copper plate 687, and in the normal position the brush 680 will be engaging the non-conducting disk 686 through a cutout 690 in the plate 687. However, in every position other than normal the brush 680 will engage the conducting plate 687 and the circuit will be completed from the brush 679 through the plate 687 to the brush 680, the purpose of which will become apparent as the description progresses. The contact disk 650 is divided into 10 equal portions 0 to 9, and it will be noted by reference to Fig. 16 that the brushes 679 and 680 will be interconnected through the plate 687 at all rotative positions except normal or zero positions, and by reference to Fig. 17 it will be apparent that the brush 678 will be electrically connected through the plate 688, copper rivets 689 and plate 687 to the brush 679 only in rotative position 9.

The disk 650 (Figs. 3 and 10) is fixed to a clutch collar 691 rotatably mounted upon the shaft 643 and is restrained from movement axially of the shaft 643 by a collar 692 (Fig. 16) pinned to the shaft 643 and by the intermediate plate 626 against which it abuts. The clutch collar 691 has teeth formed on the left face thereof (Fig. 3) adapted to be engaged by a driving clutch member 693 which is keyed to the shaft 643 and rotates therewith, but is slidable axially thereof to move the toothed face of the driving clutch member 693 into engagement with the toothed face of the clutch member 691. An annular groove 694 is formed in the driving clutch member 693 and is engaged by a yoke 695 formed on an armature 696 of an electromagnet 697 mounted upon the end plate 615 and normally urged at its upper end to the left by a compression spring 698 fixed to a magnet supporting bracket 699, mounted upon the end plate 615. From the description of the contact disks thus far, it will be apparent that upon the energization of the electromagnet 697 associated with the millions (M) register, the contact disk 650 will be rotated through predetermined distances depending upon the length of time which the electromagnet 697 is energized. It will be understood that the units (U), tens (T), hundreds (H), thousands (TH), ten thousands (TT) and hundred thousands (HT) registers are constructed in exactly the same manner as the millions register and are provided with electromagnets 705, 706, 707, 708, 709, and 710, respectively, which operate to drive their associated contact disks 644 to 649, inclusive, in exactly the same manner that the electromagnet 697 may be actuated to effect a driving of the contact disk 650.

The clutch collar 691 is provided with a center stop cam 715 (Figs. 3 and 10) having cooperating therewith a spring pressed center stop 716 mounted on the intermediate plate 626 for stopping the contact disk in the center of each of the positions 0 to 9 upon rotation being imparted thereto through the engagement of the two clutch faces. The clutch collar 691 is also provided with a carry cam 717 which is adapted to engage a cam roller 718 mounted upon a bell crank lever 719 pivoted to the intermediate plate 626. The engagement of the cam roller 718 by a raised portion 720 of the carry cam 717 will start immediately upon the contact disk 650 being rotated into the position where it indicates 9, and as the contact disk passes into the 0 position, the bell crank lever 719 will be moved in a counterclockwise direction (Fig. 10) and will be locked in that position since its horizontally extending portion is provided at the left end (Fig. 10) with a pair of notches 721 and 722 adapted to be engaged by a center stop 723 which will hold the lever in either its normal position as shown in Fig. 10 or in its actuated position after being moved in a counterclockwise direction by the carry cam 717. Upon movement of the bell crank lever 719 in a counterclockwise direction, it will move a contact spring 726 to the right (Fig. 10) due to the engagement of the contact spring 726 by a pin 727 mounted on the bell crank 719 into position to make contact with a pair of contact springs 724 and 725 upon their movement to the left in a manner now to be described:

Positioned upon the shaft 624 adjacent its left end (Fig. 3) is a bell crank restoring cam 731 having cooperating therewith a cam lever 732 carrying a cam roller 733 and pinned to a rocker shaft 734 journaled in an extending portion of the end plates 625 and 615. The rocker shaft 734 has pinned thereto a plurality of bell crank lever restoring arms 735 one for each of the registers. The bell crank lever restoring arm 735 associated with the millions (M) register will engage the contact spring 724 and move it into engagement with the contact spring 725 every time the shaft 624 is rotated and in the event that the contact spring 726 has been moved to the right (Fig. 10) the contact spring 725 will be moved into engagement with it and through it will force the bell crank lever 719 to its normal position as shown in Fig. 10. Incidentally circuits will be completed between the contact springs 724, 725, and 726 to effect a carry made necessary in a manner to be described in connection with the description of the controlling circuits of the mechanism.

Figure 13:
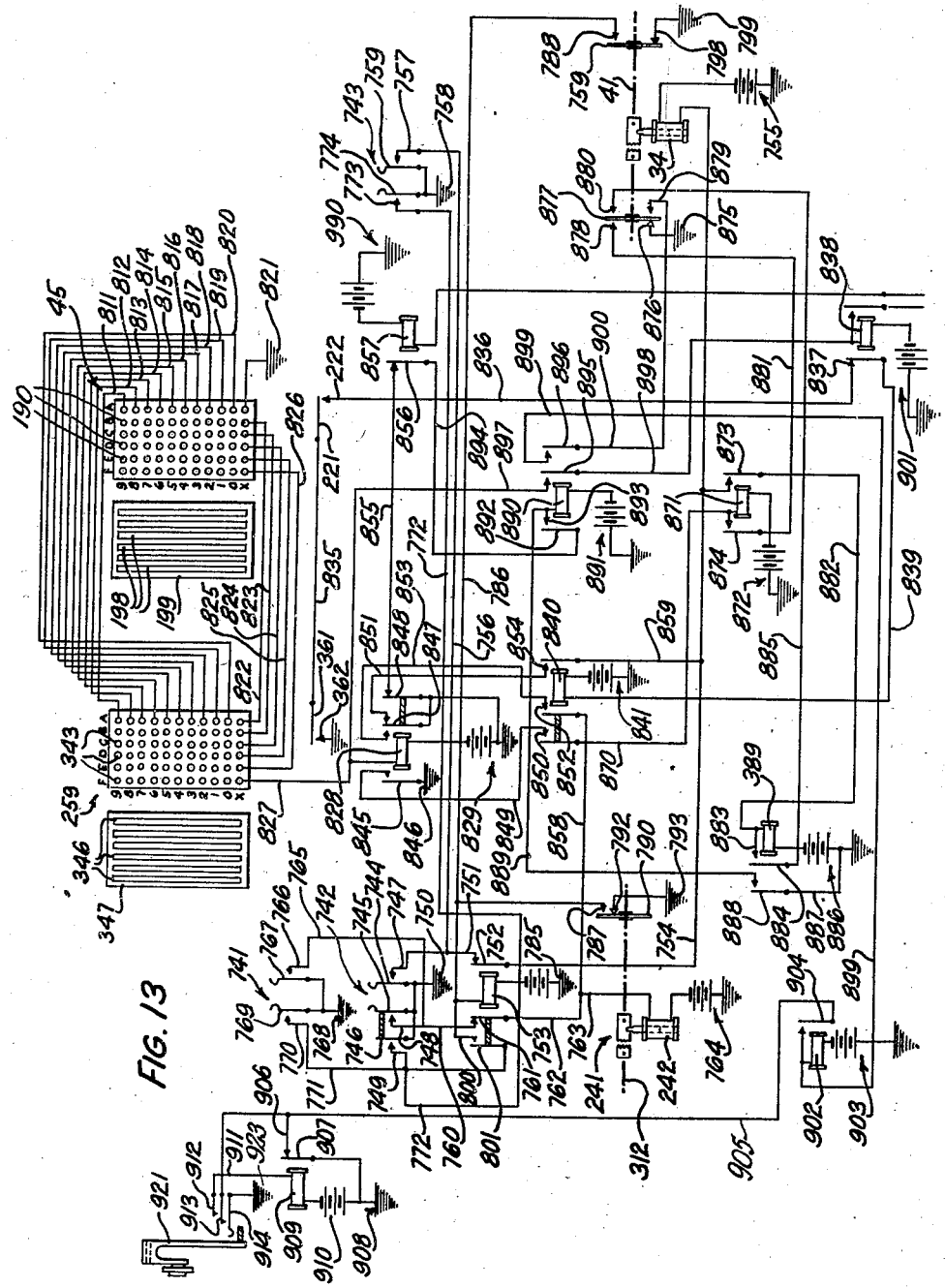

The means for synchronizing the operation of the various mechanisms in the system will be described in connection with the electrical circuits for the system which are shown in Figs. 13 and 14.

There are provided on the base plate 11 (Fig. 1) three electrical contact keys 741, 742, and 743 which are shown schematically on Fig. 13, and which control the item card handling mechanism, the entire machine, and the file card handling mechanism, respectively. The key 742 (Fig. 13) is provided with three movable contacts 744, 745, and 746 and three stationary contacts 747, 748, and 749, respectively. Upon operation of the key 742 circuits will be completed between the contacts 744 and 747, 745 and 748, and 746 and 749. The contacts 744, 745, and 746 are connected to ground at 750 and the contact 747 is connected through a conductor 751 to a right hand movable contact 752 of a relay 753 which in turn is connected through a conductor 754 to the winding of the electromagnet 34, the other side of the windings of which are connected to battery and ground at 755 and which controls the operation of the clutch which drives the shaft 41 for operating the file card sensing mechanism. A conductor 756 leading from the conductor 751 is connected to a fixed contact 757 forming a part of the key 743 and upon operation of the key 743 will be connected to ground at 758 through a movable contact 759 adapted to be actuated by the key. The operation of key 742 will complete a circuit from ground at 750 through the contacts 745 and 748, a lead 760, inner left hand contact 761 of relay 753, conductors 762 and 763 to the windings of the electromagnet 242 the other end of the windings of which are connected to battery and ground at 764, thus causing the clutch 241 to drive the item card feeding and sensing mechanisms. The lead 760 is connected by a lead 765 to a fixed contact 766 of the key 741, and upon operation of the key 741 is adapted to be connected through the contact 766 and a movable contact 767 to ground at 768. Ground at 768 is also connected, upon operation of the key 741, through a movable contact 769, a fixed contact 770 and a lead 771 to the left hand fixed contact 749 of the key 742. Also connected to the contact 749 is a conductor 772 leading to a left hand fixed contact 773 of the key 743, and upon operation of the key 743 the contact 773 will be connected to ground at 758 through the movable contact 774 of the key 743.

From the description of the circuit connections thus far, it will be apparent that assuming that the relay 753 is in its normal position as indicated in Fig. 13 the operation of the key 742 will complete circuits to the electromagnets 34 and 242 to cause the item and file card sensing mechanisms to operate through one complete cycle. Furthermore, it will be apparent that the operation of the key 741 will cause the item card sensing and feeding mechanisms to be driven through one complete cycle, while the file card feeding and sensing mechanism will stand still and in like manner the operation of the key 743 will cause the file card sensing and feeding mechanism to be driven through one cycle, while the item card sensing and feeding mechanisms stands still, the clutches associated with the file and item card sensing and feeding mechanisms being of such a type as will upon momentary energization of their associated electromagnets drive the mechanisms through one cycle and then automatically disengage.

The relay 753 is provided so that in the event that any one of the keys 741, 742, or 743 are held in their operated positions for too long a time the relay 753 will be operated to break the circuit connections between the conductor 751 and the contact 752 and between the lead 760 and the contact 761 to disconnect ground from the electromagnets 242 and 34. The energization of relay 753 is effected by the completion of circuits through contact disks driven by the item and file card sensing mechanisms. The relay 753 has one side of its windings connected to battery and ground at 785 and the other side of its windings are connected through a conductor 786 to brushes 787 and 788. The brush 787 is mounted upon the base 11 beneath the item card sensing head (Fig. 7) and contacts with an insulating portion 789 of a contact disk 790 mounted upon the shaft 312, when the shaft 312 is in its normal position as shown in Fig. 7, and the brush 787 will make contact with a conducting portion 791 of the contact disk 790 shortly after the shaft 312 carrying the contact disk 790 moves out of its normal position to complete a circuit through the conducting portion 791 of the contact disk to a brush 792 connected to ground at 793.

The brush 788 (Figs. 4, 9, and 13) is mounted upon the base 11 under the file card sensing mechanism and normally engages an insulating portion 794 of a contact disk 795 mounted upon the shaft 41 and shortly after the shaft 41 begins to move out of its normal position as shown in Fig. 4 a conducting portion 796 of the contact disk 795 will engage the brush 788 and through a plate 797 of which the portion 796 forms a part will complete a circuit to a brush 798 connected to ground at 799 since the brush 798 is always in contact with the plate 797. The momentary completion of a circuit through the brush 787 or 788 will energize the relay 753 whereupon the relay will lock up through its outer left hand fixed contact 800 and its outer left hand movable contact 801 which is connected to the left hand fixed contacts 770, 773, and 749 of the keys 741, 743, and 742, respectively, until the operator releases the key which is held operated. The operation of relay 753 will prevent the accidental entering of a card into either the file card or item card sensing mechanisms due to the operator holding one of the keys 741, 742 or 743 depressed for too long a time, since upon its operation it will break the circuits leading to the electromagnets 34 and 242 through its right hand contact 752 and its inner left hand contact 761.

Fig. 13 shows schematically the connections between the item and file card sensing heads 259 and 45, respectively, for comparing record cards which have been advanced under the heads. As mentioned in connection with the description of the item and file card sensing heads 259 and 45, respectively, each sensing head has positioned therein 66 sensing pins arranged in 6 rows of 11 each. For the sake of simplifying the description of this mechanism the 6 columns have been lettered A, B, C, D, E, and F, consecutively, running from right to left (Fig. 13) and the 11 rows have been lettered 0, 1, 2, 3, 4, 5, 6, 7, 8, 9, and X. It will be understood that the row X of sensing pins is the extreme left hand row (Figs. 4 and 7), that the row 0 of 6 sensing pins in each head is the second row of pins from the left (Figs. 4 and 7), and that row 9 fo 6 sensing pins in each head is the extreme right hand row of pins (Figs. 4 and 7), the intermediate rows being shown consecutively. The rows X of 6 pins in each head are so positioned that a card thereunder will not be engaged by them, and the other pins in the rows will all engage the card except where they encounter perforations in the card and at these positions the pins will extend through the cards to make contact with their respective metallic contact bars 198 or 346 depending upon the head in which the card is positioned. All of the pins in the file card sensing head 45 are interconnected with their corresponding pins in the item card sensing head 259 except the pins in rows X.

A specific example of this interconnection is shown wherein the column A of 11 sensing pins of the file card sensing head 45 is interconnected with the column A of 11 sensing pins of the item card head 259 with the exception of the last or X row of 6 pins. The zero pin in column A of file card head 45 is interconnected with the zero pin of the column A of the item card head by a conductor 820, the 1 pins of columns A of both heads are interconnected by a conductor 819, the 2 pins of columns A of both heads are interconnected by a conductor 818, the 3 pins of columns A of both heads are interconnected by a conductor 817, the 4 pins of columns A of both heads are interconnected by a conductor 816, the 5 pins of columns A of both heads are interconnected by a conductor 815, the 6 pins of columns A of both heads are interconnected by a conductor 814, the 7 pins of columns A of both heads are interconnected by a conductor 813, the 8 pins of columns A of both heads are interconnected by a conductor 812 and the 9 pins of columns A of both heads are interconnected by a conductor 811. The pins 0 to 9 of columns B of the item sensing head 259 and the file sensing head 45 are interconnected in the same manner and similar connections are made between the columns C, D, E, and F of the two sensing heads.

The X pin of column A of the file card sensing head is connected to ground at 821, the X pin of column B of the file card sensing head 45 is connected to the X pin of column A of the item card sensing head by a conductor 822, the X pin of column C of the file card sensing head 45 is connected through a conductor 823 to the X pin of column B of the item card sensing head 259, the X pin of column D of the file card sensing head 45 is connected to the X pin of column C of the item card sensing head 259 by a conductor 824, the X pin of column E of the file card sensing head 45 is connected to the X pin of column D of the item card sensing head 259 by a conductor 825, and the X pin of column F of the file card sensing head 45 is connected to the X pin of column E of the item card sensing head 259 by a conductor 826. The X pin of column F of item card sensing head 259 is connected by a conductor 827 to the windings of a relay 828, the other side of the windings of which are connected to battery and ground at 829.

From the description of the interconnection of the item and file card sensing heads 259 and 45, respectively, it will be apparent that each time the heads sense a card, a circuit will be completed from ground at 821 through the X brush of column A of the file card head to the metallic contact bar 198 associated with column A of the file card sensing head and thence through the card to any one of the sensing pins 180 associated with row A which finds a perforation in the card under the file card sensing head 45, from thence it will be conducted through one of the conductors 811 to 820 to the corresponding pin of the item card sensing head 259. If the item and file cards being sensed agree, the circuit will continue through that particular pin in column A of the item card sensing head 259 which finds a perforation in the card to the metallic contact bar 346 in the item card sensing head 259 associated with column A and thence through the pin X of column A of head 259, conductor 822 to pin X of column B of the file card sensing head 45 to the contact bar 198 associated with column B of the file card sensing head and thence back to the pin in column B of the item card sensing head which finds a hole corresponding to the hole in column B of the file card sensing head to the metallic contact bar 346 of column B of head 259 back through columns C, D, E and F, and finally the ground which was picked up by the X pin of column A of the file card sensing head will be connected to the conductor 827 connected to the X pin of column F of the item card sensing head 259. It will be apparent that if the cards being compared do not agree, ground will not find its way to conductor 827 and the circuits adapted to be operated by the card when the cards agree will not be operated.

There has also been provided in each of the sensing heads a contact making device which is operated only when there are cards in the heads. This device comprises the set of contacts 221 and 222 in the file card sensing head and the set of contacts 361 and 362 in the item card sensing head. By reference to Fig. 13 it will be seen that the contact 362 is connected directly to ground and if the sensing head 259 is operated while a card is in position under the head, ground will be connected through the contact 361 a conductor 835 to the contact 221 which, if a card is in position in the file card sensing head 45, will be moved into engagement with contact 222 and ground will then be transmitted over a conductor 836 to a left hand outer fixed contact 837 of a relay 838. The left hand outer contact 837 of relay 838 is normally in engagement with its associated movable contact and ground will be continued through a conductor 839 to the windings of a relay 840, the other side of the windings of which are connected to battery and ground at 841 to operate the relay 840.

It will be noted at this time that the construction and arrangement of the item and file card sensing heads is such that if no card is present under the heads, or if there is a card under only one of the heads, the relay 828 will be operated. Therefore, the relay 840 has been provided and unless it operates, indicating that cards are under both heads, it will isolate certain of the contacts of relay 828 and prevent the further feeding of cards from either of the magazines. The relay 828 is provided with three sets of contacts, a left hand movable contact 845 connected to ground at 846 and inner and outer right hand contacts 847 and 848 connected to ground at the grounded battery 829. The contact 845, upon energization of relay 828, will connect ground at 846 to a conductor 849 connected to a left hand outer fixed contact 850 of the relay 840. The contact 847 when the relay 828 is not energized, will connect ground to a conductor 851 leading to a right hand fixed contact 854 of relay 840 and the contact 847 upon energization of the relay 828 will connect ground to a conductor 853 associated with an inner left hand fixed contact 852 of relay 840. When the relay 828 is not operated, its outer right hand movable contact 848 connects ground to a conductor 855 normally connected to a movable contact 856 of a relay 857.

If cards are positioned under both heads, the relay 840 will be operated and in the event that the cards agree, the relay 828 will also be operated and ground will be connected from 829 through movable contact 847, conductor 853, fixed contact 852, inner right hand movable contact of the relay 840 to a conductor 858 connected to the conductor 763 running to electromagnet 242 to cause the operation of the electromagnet and drive the item card sensing mechanism through one complete revolution.

If the relay 840 is operated and the relay 828 is not operated, this indicates that the cards under the item and file card sensing heads 259 and 45, respectively, do not agree and therefore a new file card must be drawn into the file card sensing head 45 and compared with the card in the item card sensing head. This will be accomplished due to the completion of the following circuit: Ground at 829 through the movable contact 847, conductor 851, fixed contact 854 of relay 840, right hand movable contact of relay 840, conductors 859 and 754 to the windings of electromagnet 34, the other side of which windings are connected to grounded battery at 755. This will cause the operation of the electromagnet 34 and the consequent operation of the file card sensing mechanism to withdraw another card from the file card magazine 53 and advance it to a position under the file card sensing head 45. The just described circuit for operating the file card sensing mechanism will be completed automatically each time a file card is drawn into the file card sensing head and does not agree with the card held in the item card sensing head 259 which will be inactive until the relay 828 is energized due to the finding of agreeing cards by the file and item card sensing heads.

When a file card is found which agrees with the card in the item card sensing head, it indicates a transaction which will necessitate the perforating of a new file card and the discarding of the old file card. The cards agreeing, ground at 846 will be connected through contact 845, lead 849, fixed contact 850 to a conductor 870 connected to the windings of a control relay 871, the other side of the windings of which are connected to the battery and ground at 872, causing the control relay 871 to be energized attracting its right hand movable contact 873 and its left hand movable contact 874 which will lock up due to the completion of a circuit from ground at 875 through a brush 876 always in contact with a conducting portion of a contact disk 877 (Fig. 13) a brush 878, conductor 881 and left hand stationary contact of relay 871. The contact disk 877 is mounted upon the shaft 41 of the file card sensing mechanism (Figs. 9 and 13) and the brush 876 together with brushes 878, 879, and 880, are mounted upon and insulated from the base 11. As pointed out hereinbefore, the brush 876 is always in contact with a conducting portion of the contact disk 877. The contact disk 877 is so formed that the brush 878 engages a conducting portion thereof only when the disk 877 is in its normal position, the brush 879 engages a non-conducting portion thereof only when the disk 877 is in its normal position, and the brush 880 engages a conducting portion of the contact disk 877 while the contact disk is in its normal position and for a short time thereafter while the card which has been in the file card sensing head travels slightly beyond the card deflector 371.

From the description of the circuit thus far, it will be apparent that upon momentary energization of the relay 871 the relay will be locked up until ground from 875 through the brush 876, and disk 877 is broken by the brush 878 engaging the non-conducting portion of the disk 877 since the brush 878 is connected by a conductor 881 to the left hand movable contact 874 of the relay 871. Relay 871 will be energized each time there are cards under both the item and file card sensing heads, and the cards agree in their compared areas, and upon energization the relay 871 will be locked under the circuit through conductor 881 to the contact disk 877.

Each time the relay 840 operates with relay 871 operated and the relay 828 fails to operate, a ground connection will be established from ground at 829 through the contact 847 of relay 828, conductor 851, contact 854 of relay 840, conductors 859 and 754 through the right hand contact 873 of the relay 871, a conductor 882 to energize electromagnet 389 to raise the card deflector 371 and lock it in the raised position through a back contact 863 cooperating with left hand movable contact 864 which is connected to a lead 885 running to the brush 880. This locking circuit will be maintained until the card has passed the card deflector 371. It will be noted at this time that the circuit to the electromagnet 389 is completed by the relay 871 only after a file card has been found which agrees with the item card in the item card sensing head, and an item card has later been found which disagrees with the card in the file card sensing head.

Energization of the electromagnet 389 completes a circuit from ground at 886, through a conductor 887 to a left hand movable contact 888 of the electromagnet 389 to a conductor 889, which is connected to the windings of a relay 890, the other side of the windings of which are connected to grounded battery at 891. The relay 890 upon being energized will lock under a circuit extending from its left hand movable contact 892, its left hand fixed contact 893 which is connected to the conductor 889, a conductor 894, contact 856 of relay 857, conductor 855 and contact 846 of relay 828 which is connected to ground at 829 when relay 828 is deenergized. The relay 890, upon being energized, will attract its right hand contacts 895 and 896 to connect a conductor 897 which is connected to the conductor 827, to a conductor 898 connected to relay 838, and will connect a conductor 899 to a conductor 900 connected to the brush 879.

When the cards being compared agree, ground will be connected through the card sensing heads to conductors 827, 897, contact 895, conductor 898 to the relay 838, the other side of the winding of which is connected to battery and ground at 901 and ground at 875 will be connected through the contact disk 877, brush 879, conductor 900, contact 896, conductor 899 to the windings of an electromagnet 902, the other side of the windings of which are connected to grounded battery at 903 and which controls the shiftable plate 372. Electromagnet 902, upon being momentarily energized, will attract a contact 904 associated therewith, which is connected to a conductor 905 through a fixed contact 906 normally engaging a movable contact 907 connected to ground at 908. The contact 907 is associated with a relay 909 and upon energization of the relay 909 the contact 907 will be drawn out of engagement with the contact 906 to remove ground from the electromagnet 902.

The shiftable plate 372 (Fig. 5) which is adapted to be actuated by the electromagnet 902 is pinned to a gear segment 915 which is oscillatable upon the shaft 112 and which has meshing therewith a rack 916 formed on a solenoid 917 of the electromagnet 902 so that upon energization of the electromagnet 902 the solenoid will be attracted and the plate raised to the position shown in dotted lines, while upon deenergization of the electromagnet 902 the shiftable plate will be permitted to drop to the position shown in full lines (Fig. 5).

The relay 909 has one side of its windings connected through battery at 910 to ground at 908 and the other side of the winding is connected by a conductor 911 to a contact 912 associated with a pair of contacts 913 and 914. All of the contacts 912, 913 and 914 are controlled by a card actuated bell crank lever 921 (Fig. 5) adapted to be operated upon the passage of a card from under the perforator head 511 due to the engagement by the card in its passage of a roller 922 secured to a horizontally extending arm of the bell crank lever 921. A vertically extending arm of the bell crank lever 921 (Fig. 5) is adapted to engage the contact 914 which is connected to ground at 923 (Fig. 13) and move it into engagement with the contact 913 and after the contact 914 has engaged the contact 913, the contact 913 will be moved into engagement with the contact 912 to hold the relay 909 energized until the card has passed beyond the roller 922 at which time the circuit for the relay 909 will be broken due to the disengagement of the contacts 912, 913, and 914. Simultaneously with the release of the relay 909, electromagnet 902 will be released since the relay 909 is a slow releasing relay and its contact 907 will not engage the contact 906 until after the electromagnet 902 has released, thus permitting the shiftable plate 372 to drop to its normal position, as shown in Fig. 5.

As long as the cards compared by the item and file card sensing mechanisms do not agree, the item card will be held in the sensing mechanism due to the operation of the circuits described hereinbefore since the normal stopping position is with the head in its lowermost position and with the pins engaging the card. Under the condition just described successive file cards will be selected from the bottom of the magazine 53 and after being sensed will be advanced directly to the file card receptacle 373. However, as soon as a file card is found the compared area of which agrees with the compared area of the item card, it is necessary to register in the register mechanism 4 the amount of stock added or withdrawn as indicated by the perforations in the item card.

When an item card is found the compared area of which agrees with the compared area of the file card held in the file card sensing head, circuits will be completed as described hereinbefore for energizing the electromagnet 242 to cause the item card sensing mechanism to be driven through one complete cycle to advance a new item card 257 from the item card magazine 253 to the item card sensing head 259 and to advance the card which was under the sensing head 259 to the receptacle 299. A card in moving from the head to the receptacle 299 will engage the card rollers 452 and 451 successively to complete and maintain circuits between the contacts 445 and 446, 447 and 448, and 449 and 450, while a card is passing under the card roller associated with the contacts. Contact 449 is connected to ground at 931 (Fig. 14) and upon engaging contact 450 will connect ground to the contact 448 to prepare a circuit, which will be completed when the contact 447 engages contact 448, to an electromagnet 932 which with a cooperating electromagnet 933 has its windings connected to grounded battery at 934.

The electromagnets 932 and 933 have a common contact shifting bar 935 which supports a plurality of contacts 936 and are so arranged that upon energization of the electromagnet 932 the contacts 936 will be moved into engagement with a plurality of contacts 937 and upon energization of the electromagnet 933 the contacts 936 will be moved into engagement with a plurality of contacts 938. The contacts 937 are, in this embodiment of the invention, seven in number and may be connected to any seven of the brushes 444 through plug and jack connections (not shown) and the contacts 938 of which there are also seven, may be connected to any seven of the brushes 441. It will thus be apparent that the contacts 936 may be connected to either the brushes 444 in the item card section of the mechanism or to the brushes 441 in the file card section of the mechanism.

Shortly after a card has engaged the card rollers 451 and 452 (Figs. 7 and 14) to associate the contacts 936 with the brushes 444 the input of items in the register mechanism will take place due to the brushes 444 encountering holes in the item card and engaging the sensing drum 443. The sensing drum 443 is connected to ground at 939 and when a brush 444 encounters a hole in the card moving between it and the drum a circuit will be completed to one of the electromagnets 705 to 710, inclusive, and 697, which are connected to grounded battery at 949, since each of the contacts 936 is connected to one of said electromagnets 705 to 710 and 697. Thus the electromagnets 705 to 710 and 697 may be energized momentarily at intervals, during the passage of the item card between the brushes 444 and the sensing drum 443, depending upon the time at which a brush 444 associated with each particular electromagnet encounters a hole in the item card and upon being momentarily energized the electromagnets will cause their associated contact disks 644 to 650, inclusive, to be driven until the register shaft 643 (Figs. 3 and 14) completes one revolution at which time the driving clutch members 693 associated with the contact disks will all be disengaged simultaneously unless a carry is to be effected as described hereinafter.

The brushes 444 will engage the drum 443 through holes in the item card only momentarily and therefore a plurality of holding relays 955, 956, 957, 958, 959, 960, and 961 are provided for maintaining the ground connection to all of the electromagnets 697 and 705 to 710 which are energized momentarily by their associated brushes 444, until the shaft 643 completes one revolution. The ground connection is maintained over a locking circuit as follows:

From ground at 962 (Fig. 14) through a brush 963 which is always in contact with a conducting portion of a contact disk 951 mounted upon the register shaft 624 (Figs. 3 and 14), a brush 964 which makes contact with a conducting portion of the disk 951 as soon as the shaft 624 begins to rotate and which engages a non-conducting portion of the contact disk as soon as the shaft 624 has driven the shaft 643 through one complete revolution, the contacts of any one of the relays 955 to 961 which have been energized simultaneously with their associated electromagnets 697 and 705 to 710, inclusive, with which they are connected in parallel through the break contacts of a punch controlled relay 965.

The punch controlled relay 965 is provided so that during a punching operation there will be no backup circuits to the electromagnets in the register mechanism, and this relay is operated only during the punching cycle since one side of its winding is connected to grounded battery at 966, and the other side of its winding is connected to a brush 967 engaging a conducting portion of a contact disk 968 mounted upon a shaft 969 driven from the shaft 502 in the punching mechanism 2, at all times except when the shaft 969 is in its normal position and as soon as the shaft 969 moves out of normal position ground at 970 will be connected through the contact disk and the brush 967 to energize the punch controlled relays 965 and 975 and maintain them energized throughout the punching cycle.

In the event that the item card sensing mechanism finds a plurality of item cards which agree with the file card being held in the file card sensing mechanism, it will be necessary for the register 4 to accumulate the algebraic sum of stock withdrawn and/or added and in so doing one of the register disks may pass from the position where it indicates 9 to the position where it indicates 0 due to the addition of two digits, the sum of which exceeds 9. It is therefore necessary to provide a carry mechanism for carrying 1 to the next higher denominational register contact disk when the next lower contact disk passes from the position where it indicates 9 to the position where it will indicate 0. As described in connection with the mechanical description of the register mechanism shown in Figs. 3 and 10, the contacts 724 and 725 are caused to engage each time the shaft 624 rotates, and in the event that a register disk passes from the position where it indicates 9 to position where it indicates 0, the contact 726 (Figs. 10 and 14) will be moved to a position where it will be engaged by contact 725. The contacts 724 and 725 prepare a circuit for adding 1 to the next higher contact disk when its next lower contact disk passes from the position where it indicates 9 to the position where it indicates 0, and in the event that the lower contact disk has passed through the 9 position, the circuit prepared will be completed and the next higher contact disk will be rotated through one position to indicate the addition of 1 thereto.

The brushes 661, 664, 667, 670, 673, 676, and 679 are always in contact with a conducting portion of their associated contact disks 644, 645, 646, 647, 648, 649, and 650, respectively, and are connected through the contacts of the punch controlled relay 965 to the windings of the holding relays 955 to 961, inclusive, respectively, and are connected directly to the windings of the electromagnets 705, 706, 707, 708, 709, 710, and 697, respectively, and to the contacts 724 associated with the contact disks 650, 644, 645, 646, 647, 648, and 649, respectively.

When a carry is to be effected due to the closing of a circuit through the contacts 725 and 726, ground at 971 (Fig. 14) will be connected to the contacts 726 through a brush 973 which always engages a conducting portion of a contact disk 972 mounted on the shaft 624, a brush 974 which makes contact with a conducting portion of the disk at an interval in the cycle of rotation of the shaft 624 after the contact 964 has broken contact with the disk 651; that is, after the input of digits into the register under control of the holding relays 955 to 961 and the brushes 444, and through the break contacts of a relay 975 connected in parallel with the punch controlled relay 965. The duration of the engagement of the brush 974 with the conducting portion of the disk 972 is such that one will be entered in any register where the contact 726 contact disk in the register where the contact 726 has been moved to a position to be engaged by its associated contact 725. If the disk 644 in the units order has passed from 9 to 0, the circuit for carrying 1 will pass through the contact 726 associated with the units register to the contact 725 and 724, to relay 706, in the tens (T) register, thus to enter 1 in the next higher or tens (T) order when the units or (U) register passes from 9 to 0. The circuits for the tens (T), hundreds (H), thousands (T), ten thousands (TT) and hundred thousands (HT) registers are exactly the same as that for the units (U) register, and the circuits for the millions (M) register are the same as those from units (U) to hundred thousands (HT) except that the millions (M) register, in passing from 9 to 0, will complete a circuit from ground at 971 through its contacts 726, 725 and 724, to the electromagnet 705 in units register.

It will be noted at this time that, due to the fact that the highest denominational order register carries into the lowest denominational order register, cards which represent a withdrawal of stock from a supply may be punched with the complement of the number withdrawn which totals nine and will control the register to effect subtraction. For example, if the amount withdrawn is 8437 parts or items, the number 9991562 should be punched in the card and will be entered upon the register, and if the stock previously on hand was 54987 parts, the number 9991562 will be added to 54987 which prior to the carry portion of the cycle will cause the contact disks to be in position to register that 9945449 is stored therein. When the carry pulse is sent through the disks, carries will be made from the millions order to the units order, from the units order to the tens order, from the tens order to the hundreds order, from the hundreds order to the thousands order, from the ten thousands order to the hundred thousands and from the hundred thousands order to the millions order, and the final result will appear as 0046550. Schematically the problem may be shown as follows:

9991562—complement of the number of parts withdrawn (8437)
54987—number of parts in stock prior to transaction
9945449—number represented by register prior to carry pulse
11 1111—carries
0046550—number of parts left after withdrawal.

In the problem just discussed there are three ordinary carries necessitated by registers passing from 9 to zero and the method of making such carries was described hereinbefore. There are also three multiple carries necessary. These multiple carries are necessary since nine was registered in the units, hundred thousands and millions order during the regular input cycle and the ten thousand order passed from nine through zero thereby making a carry necessary into the hundred thousands order. The hundred thousands order register being in nine and receiving a carry pulse must change to a zero registration and make a carry to the millions order. The millions order register also being 9 must change to zero and make a carry to the units order which registers 9 and therefore must change to zero and make a carry to the tens order which will then register five. In order to accomplish this the contact disks 644 to 650, inclusive, have each been provided with a conducting portion which will engage with the brushes 660, 663, 666, 669, 672, 675, and 678, respectively, when their associated contact disks are in the nine position. Therefore, in the problem just given the brushes 660, 675, and 678 will, when the carry pulse is sent through from ground at 971, be in engagement with a conducting portion of their associated disks and will be connected through the disks 644, 649, and 650 to their associated brushes 661, 676, and 679, respectively. Due to this condition the carry pulse will also be directed to the electromagnets 697, 705, and 706 over the circuits from contact 724 in the ten thousands order which is grounded in making the ordinary carry from the ten thousands order to the hundred thousands order, brush 676, disk 649, brush 675, contacts 725 and 724 in the hundred thousands order to electromagnet 697, from contact 724 in the hundred thousands order, brush 679, disk 650, brush 678, contacts 725 and 724 in the millions order, to electromagnet 705, and from contact 724 in the millions order, brush 661, disk 644, brush 660, contacts 725 and 724 in the units order to electromagnet 706.

Due to the completion of the just described circuits the information stored in the sensed portion of the item card or cards which have been found to agree with a file card in the file card sensing mechanism, will be entered in the register, and the file card will be held in the file card sensing mechanism until all item cards agreeing therewith have passed out of the item card magazine and an item card which does not agree with the file card being sensed is found, at which time circuits will be completed to hold the item card which does not agree with the file card held in the file card sensing mechanism, and the file card which had been held in the file card sensing mechanism will be moved out of the file card sensing head as described hereinbefore and directed downwardly (Fig. 4) by the card deflector 371 to pass between the sensing brushes 461 and contact drum 395. In moving downwardly the file card coming from the file card sensing head will engage the card rollers 392 and 379 in succession. The file card in engaging the card rollers 392 and 379 will cause ground to be connected from 931 through the contacts 431 and 432 associated with roller 392 and through contacts 380 and 381 associated with card roller 379 to the electromagnet 933 to energize it and shift the contacts 936 into engagement with the contacts 939, so that the card in continuing its downward motion between the drum 395 and brushes 441 will control input of the data indicated on the file card into the register in the same manner that the brushes 444 and drum 443 control the input of the items in the register. The register controlling electromagnet 632 having been operated substantially simultaneously with the relay 933 over a circuit from grounded battery through the electromagnets 632 and contacts 382 and 383 to ground. As soon as the file card has passed the brushes 441, the register will have stored therein the algebraic sum of the item or items added or withdrawn from the supply of stock as indicated on the file card.

The circuits which operate to cause the file card sensing mechanism to pass through one cycle of operation are controlled by the sensing heads. After the item cards which agree with a held file card have controlled the register mechanism and an item card is found the compared area of which does not agree with the compared area of file card, relay 828 will fail to operate. Relay 840, however, will be operated indicating that there are cards under both sensing heads, and a circuit will be established to operate relay 871 and the file card sensing and feeding mechanism. Ground at 829 will be connected through contact 847 of the relay 828, contact 854 of relay 840 which is energized, to electromagnet 34 to drive the file card mechanism through one cycle. Since relay 871 had been locked up over a circuit from ground at 875 through brush 876, contact disk 877, brush 878, and the normally broken contact 874 of relay 871 to the winding of the relay 871, ground will be connected from 829 through contact 847 of relay 828 and contact 854 of relay 840, contact 873 of relay 871 to energize electromagnet 389 to lift the card deflecting plate 371 upwardly and cause the file card to be directed downwardly to the card feed rollers 377 and 378, which will in turn advance the card past the card rollers 379 and 392 and the brushes 441. The relay 389 will remain locked up through its contacts 883 and 884, and brush 880 which engages a conducting portion of the contact disk 877 until the card has been advanced past the card deflector, at which time the ground connection to electromagnet 389 will be broken at the contact disk 877 to release the card deflector 371. When electromagnet 389 is energized, ground will be connected from 886 through contact 888 to operate relay 890 and, upon operation relay 890 will remain locked up over a locking circuit through contacts 892 and 893 of relay 890, and contact 856 of relay 857 and contact 848 of relay 828 to ground at 829. Relay 890 having been energized, ground will be connected through contact disk 877, brush 879, contact 896 of energized relay 890 to energize electromagnet 902 which will thereupon lock up through contact 904 and normally made contacts 906 and 907 of relay 909 to ground at 908. This locking circuit for the electromagnet 902 will be maintained until a new file card is perforated and advanced out of the perforating mechanism so that electromagnet 902 will hold the plate 372 in its upward position as shown in dotted lines Fig. 5, where succeeding cards advanced from the file card mechanism will be held until the punching operation for the file card which is to replace the file card which had previously controlled the register is completed, and until the card has been deposited in the receptacle 373. As soon as the newly punched card has been advanced to the receptacle 373, and in advancing to the receptacle has actuated the card roller 922, card roller 922 will cause ground to be connected from 923 (Fig. 13) through contacts 912 and 913 to energize relay 909 and supply an auxiliary locking ground connection to electromagnet 902. The ground connection to electromagnet 902 will be maintained through the completion of the circuit thereto by the engagement of contacts 913 and 914 until the card passes roller 922, and since relay 909 is a slow releasing relay, the contacts 906 and 907 will not be permitted to re-engage after the breaking of the circuit which held relay 909 operated until the newly punched file card is safely into the receptacle 373 and after the auxiliary ground connection to electromagnet 902 has been broken due to the disengagement of contacts 913 and 914. Thus, during the punching operation file cards may be compared with a held item card and advanced to the plate 372 where they will be stacked until after the completion of the punching operation providing a file card has not been found which agrees with the item card held in the item card sensing station. The deposit of the newly punched card in the receptacle 373, will take place when relay 902 is deenergized and will drop the stack of cards into the receptacle on top of the newly punched card, thereby insuring the proper filing of the cards into the receptacle.

When a file card is found which agrees with the card held in the item card sensing head before the completion of the punching operation relay 828 will operate over a circuit from ground at 821, through file and item sensing heads, conductor 827, winding of relay 828 to grounded battery at 829. The circuit from ground at 821 is also completed from conductor 827 through conductor 897, fixed contact of relay 890 movable contact 895 of relay 890 and winding of relay 838 to grounded battery at 901. Relay 838 then locks to ground at 970 through brush 991 and contact disk 968. This locking circuit opens and holds open the operating circuit of relay 840 until the register mechanism is cleared of a previous result thereby preventing operation of electromagnet 242 which controls the feeding of item cards.

The file card which is to be superseded at this time has been advanced past the brushes 441, and the information stored therein which is involved in the computation to be effected, has been transmitted to the register, which now indicates the result of the computation. Continued movement of the file card to be superseded downwardly, will cause it to engage the card roller 394 and substantially simultaneously with the engagement of the card roller 394 by a file card to be superseded, the card will pass between the drum 397 and the brushes 442. The card roller 394 upon being actuated will connect ground from the contact 434 to contact 433 to operate the electromagnet 632 for starting the register mechanism through a cycle of operation and the contact 433 will engage the contact 430 to connect ground to the electromagnet 488 to simultaneously start a cycle of operation of the perforating mechanism, and to energize the relays 965 and 975. This ground connection to the relays 965 and 975, upon being made due to the operation of the contacts 430, 433, and 434, will be maintained from ground at 970 through the contact disk 968 and the brush 967 until the shaft 969 drives through almost an entire rotation. The breaking of the circuit at the brush 967 occurs at the same time that the disk 972 on the shaft 624 reaches a position where an input of one in a carry operation would have taken place had the relay 875 not been operated.

As soon as the forward end of the file card is between the brushes 442 and the drum 397, the file card will control the portion of the punching mechanism not associated with the register. When the file card is passing between the brushes 442 and drum 397, the holes in the card will control the operation of the electromagnets 595 in the perforating mechanism which have been connected to the brushes 442 by the plug and jack connections 978. Thus, while the amount of stock after a computation is recorded in the card under control of the register mechanism, all information, on the discarded file card, which was not involved in the computation may be recorded on the new file card under control of the old file card passing between the brushes 442 and drum 397. The circuits for controlling the perforating of this information are made at intervals in accordance with the position of holes in the various columns of the discarded file card and extend from grounded battery at 976 through contact disks 977, winding of electromagnets 595, plug and jack connections 978, brushes 442 engaging drum 397 through holes in the card, to ground at the drum.

A plurality of contact disks 985 are mounted upon the shaft 969 and have conducting portions thereof connected to ground at 986 through brushes 987 which always engage conducting portions of the disks and since the shaft 969 rotates in synchronism with the shaft 624 due to the simultaneous energization of the clutch actuating electromagnets associated with the two shafts, the ground connection at 986 will be continued through the contact disks 985 to a plurality of brushes 988, which engage a conducting portion of the contact disks 985 as soon as the contact disks move out of their normal position, and until the completion of the first half revolution thereof, to the brushes 662, 665, 668, 671, 674, 677, and 680. The brushes 662, 665, 668, 671, 674, 677, and 680 engage conducting portions on the contact disks 644, 645, 646, 647, 648, 649, and 650, while their associated disks are in all of their rotated positions except the position where they indicate zero. Therefore, as soon as the shaft 969 carrying the contact disks 985 moves out of normal position, ground will be connected through the brushes 988 and their associated brushes 662, 665, 668, 671, 674, 677, and 680, and brush 679 to energize the eletcromagnets 705 to 710 and 697 the associated contact disks of which are not in their zero indicating position, and this ground connection will be maintained through the disks 644 to 650 until each disk arrives at the position where it indicates zero. Through the just described circuit, the register contact disk will be turned forward to their zero indicating position, the disk always turning in the same direction while accumulating and while clearing out to zero. As each disk reaches its "9" position during a clearing operation, circuits will be completed to energize the electromagnets 595 associated therewith through the brushes 660, 663, 666, 669, 672, 675, and 678, and the brushes 662, 665, 668, 671 674, 677, and 680, and the electromagnets 595 upon being energized will lift their associated selector bars 571 (Fig. 5) into engagement with the segmental gear 585, which will be rotating in a counterclockwise direction (Fig. 5) and the selector bars will be advanced over the heads of the perforating pins 543 to select a perforating pin for actuation in accordance with the number indicated in the register, or in the card passing between the sensing rollers 397 and the brushes 442.

For example, let it be assumed that the contact disk 644 has, in the computation performed by the machine, arrived in its "seven" position. When the shafts 969 and 624 start to rotate in a resetting operation, the shaft 582 carrying gear segment 585 will start to rotate in a counter-clockwise direction (Fig. 5). Disk 644 after rotating two-tenths of a revolution will arrive in the nine position and at that time a circuit will be completed from ground at 986 through a brush 987, contact disk 985, a brush 988, brush 662, contact disk 644 (in the nine position), brush 660, plug and jack connection 978, winding of electromagnet 595, and contact disk 977 to grounded battery 976. Gear segment 585 will, at the time the above circuit is completed, have rotated two-ninths of its ultimate travel in a counter-clockwise direction. Electromagnet 595, associated with the contact disk 644, through the plug and jack connection 978, will move its associated selector bar 571 into engagement with the gear segment 585 at this time in the cycle. Therefore, the selector bar will be moved by the gear segment for the remainder of the movement of the gear segment in a counter-clockwise direction or to put it another way, the selector bar will move through seven positions or from position above the perforating pin for zero to position above the perforating pin for the digit seven. When this selector bar and any others that were moved off their associated zero pins have arrived in position the ram will force them and the pins that remained over the zero pins through the card fed from magazine 475. After punching the card the selector bars will be retracted to their normal positions as shown in Fig. 5, by the gear segment 585. This punching mechanism is an adaptation of the punch shown in Patent 1,881,639 to H. G. Johnstone, issued October 11, 1932.

It will be understood that as soon as the electromagnet 488 is operated, the file card to be superseded will, in passing between the roller 397 and brushes 442, selectively energize certain of the electromagnets 595, and the remainder of the electromagnets will have their operation controlled by the contact disks in the register. The segmental gear 585 at this time will be rotating in a counterclockwise direction, and as the electromagnets 595 are energized their associated selector bars 586 will be advanced to select a perforating pin 543 in each column of perforating pins for actuation by the ram 540 which will, after all the selector bars which are selected for actuation have been advanced to select perforating pins, be moved downwardly to perforate a card which has been advanced thereunder from the magazine 475, and after perforation the card will, upon the upward movement of the ram 540, be released by the card stop 561, and advanced to the receptacle 373. As soon as the ram 540 returns to its upper position the segmental gear will be rotated in a clockwise direction to return the selector bars 586 to normal position.

At the end of the cycle of operation of the perforating mechanism, that is, just before the clutch 491 disengages, a brush 989 will engage a conducting portion of the contact disk 968 to energize relay 857 due to the completion of a circuit from grounded battery at 990 through the relay 857 to ground at 970, thereby opening the locking path of relay 890 which must be released before a new file card is found, which agrees with the item card held in the item card sensing head. However, assuming that a file card is found which agrees with the item card held in the item card sensing head before the end of the punching cycle, then relays 829 and 838 will be operated simultaneously from ground at 821 through the sensing heads and the locked up contact 895 of relay 890, and due to the releasing of relay 890 by the breaking of its ground circuit through the contact 848 of the relay 828 and electromagnet 84 controlling the feeding of file cards will not be energized due to the opening of the circuit to relay 840 at contact 837 of relay 838 which will have been energized.

When this condition occurs, the feeding mechanism for the file cards will be held inoperative until a brush 891 which engages a conducting portion of the contact disk 866 in normal position, and until near the end of the cycle of the perforating mechanism breaks its ground connection to the relay 838 to cause the deenergization of the relay 838 at which time the register mechanism will be cleared out and it will be safe to run item cards past the brushes 444 to put into the register mechanism items representing a computation to be effected.

After a new file card is found which agrees with the item card being held in the item card sensing mechanism, the operation described heretofore will be repeated until the supply of cards in either of the magazines is exhausted, and at that time relay 840 will fail to operate due to the removal of the ground connection at 362 from the operating circuit for the relay 840, because of the failure of one of the contacts 361 or 221 engaging the contact associated therewith.

Although a specific embodiment of the invention has been described in detail, it will be understood that many modifications may be made without departing from the scope of the invention which is to be limited only by the appended claims.

What is claimed is:

1. In a control apparatus for a card controlled accounting system, a pair of sensing heads, a plurality of columns of pins in each head, a row of pins in each head, means interconnecting corresponding pins in corresponding columns of pins, and means interconnecting the pins in the rows of pins and those pins in the columns of pins which find perforations in the cards when the areas of the cards sensed agree.

2. In a card controlled accounting system, means for comparing record cards to govern the operation of the system, comprising an electrical control circuit and means for establishing said circuit including means for effecting a plurality of point contacts with the upper surfaces of a pair of cards, means effecting a plurality of line contacts with the lower surfaces of said cards, means interconnecting predetermined ones of said point contact making means, and means operable to interconnect predetermined ones of said line contact making means.

3. In a card controlled computing system, an item card and a file card sensing means for establishing an electrical circuit through holes in cards which agree in the sensed areas, each sensing means comprising a plate having a sensing bar therein for each denominational order to be sensed, a head having a plurality of groups of card sensing pins arranged in denominational orders and positioned in alignment with the sensing bars, means interconnecting each card sensing pin in the item card sensing means with a corresponding card sensing pin in the file card sensing means, and means for connecting the sensing bars and sensing means when the cards agree to establish said circuit.

4. In a card comparing system, a plurality of sensing devices each comprising a plurality of pins, a plurality of bars adapted to be engaged by pins through apertures of cards in the sensing devices, means for interconnecting the pins of one of said devices with corresponding pins of another device, a control circuit, and means for serially interconnecting the bars to complete the control circuit when the pins engage corresponding apertures in the cards.

HAROLD G. JOHNSTONE.